US010654443B2

(12) United States Patent
Nagata et al.

(10) Patent No.: US 10,654,443 B2
(45) Date of Patent: May 19, 2020

(54) WEBBING TAKE-UP DEVICE

(71) Applicant: KABUSHIKI KAISHA TOKAI-RIKA-DENKI-SEISAKUSHO, Aichi (JP)

(72) Inventors: Yuya Nagata, Aichi (JP); Takahiro Osaki, Aichi (JP); Takuhiro Saito, Aichi (JP); Tomonari Umakoshi, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 257 days.

(21) Appl. No.: 15/738,345

(22) PCT Filed: Jun. 24, 2016

(86) PCT No.: PCT/JP2016/068907
§ 371 (c)(1),
(2) Date: Dec. 20, 2017

(87) PCT Pub. No.: WO2017/006788
PCT Pub. Date: Jan. 12, 2017

(65) Prior Publication Data
US 2018/0215343 A1    Aug. 2, 2018

(30) Foreign Application Priority Data

Jul. 7, 2015    (JP) .................................. 2015-136272

(51) Int. Cl.
*B60R 22/36* (2006.01)
*B60R 22/46* (2006.01)

(52) U.S. Cl.
CPC .......... *B60R 22/4671* (2013.01); *B60R 22/36* (2013.01); *B60R 22/46* (2013.01);
(Continued)

(58) Field of Classification Search
CPC ..... B60R 22/36; B60R 22/46; B60R 22/4671; B60R 2022/468; B60R 2022/4666; B60R 2022/4685
See application file for complete search history.

(56) References Cited

U.S. PATENT DOCUMENTS

2013/0341451 A1    12/2013  Saito et al.
2016/0023577 A1     1/2016  Yamada et al.
(Continued)

FOREIGN PATENT DOCUMENTS

| CN | 103507748 A | 1/2014 |
| JP | 2014-004852 A | 1/2014 |
| WO | 2014148491 A1 | 9/2014 |

OTHER PUBLICATIONS

International Search Report and Written Opinion issued in the corresponding application PCT/JP2016/068907 dated Aug. 23, 2016.

*Primary Examiner* — Sang K Kim
(74) *Attorney, Agent, or Firm* — Roberts Calderon Safran & Cole P.C.

(57) ABSTRACT

A webbing take-up device includes clutch weights. The clutch weights are supported at the base and include engaging portions. The clutch weights move to a rotation diameter direction outer side when the base is rotated, and are capable of transmitting rotary force applied to the base to the spool. The webbing take-up device is provided with a stopper that is capable of relative rotating relative to the base and that is provided with engaged holes, each including an allowing portion and a restricting portion. The allowing portions allow movement of the engaging portions to the rotation diameter direction outer side when the base is rotating to one side. The restricting portions restrict movement of the engaging portions to the rotation diameter direction outer
(Continued)

side when the base is rotating to the other side. The restricting portions are formed integrally with the allowing portions.

3 Claims, 12 Drawing Sheets

(52) U.S. Cl.
 CPC . *B60R 2022/468* (2013.01); *B60R 2022/4666* (2013.01); *B60R 2022/4685* (2013.01)

(56) References Cited

U.S. PATENT DOCUMENTS

| 2016/0244020 | A1* | 8/2016 | Umakoshi | B60R 22/46 |
| 2016/0311398 | A1* | 10/2016 | Osaki | B60R 22/44 |
| 2016/0347277 | A1* | 12/2016 | Nagata | B60R 22/44 |
| 2017/0341626 | A1* | 11/2017 | Nagata | B60R 22/48 |
| 2017/0369030 | A1* | 12/2017 | Osaki | B60R 22/44 |

\* cited by examiner

WEBBING TAKE-UP DEVICE

CROSS-REFERENCE TO RELATED APPLICATIONS

The present application is a U.S. National Phase of PCT/JP2016/068907 filed on Jun. 24, 2016 claiming priority to Japanese Patent Application No. 2015-136272 filed Jul. 7, 2015. The disclosure of the PCT Application is hereby incorporated by reference into the present Application.

TECHNICAL FIELD

The present invention relates to a webbing take-up device.

BACKGROUND ART

Japanese Patent Application Laid-Open (JP-A) No. 2014-4852 discloses a webbing take-up device in which a clutch provided between a motor and a spool is rotated by the motor and transmits rotation of the motor to the spool. The clutch includes a base, a pair of weights supported at the base, and a stopper that is rotatably supported at the base. When the clutch is being rotated to one side by the motor, the weights move to a rotation diameter direction outer side of the base. Thus, the rotation of the motor to the one side is transmitted to the spool. When the clutch is being rotated to the other side by the motor, movement of the weights to the rotation diameter direction outer side is restricted by the stopper. Thus, the rotation of the motor to the other side is not transmitted to the spool.

SUMMARY OF INVENTION

Technical Problem

However, in the webbing take-up device recited in JP-A No. 2014-4852, the stopper is displaced from a region that allows the movement of the weights to the diametric direction outer side to a region that restricts this movement by the stopper being turned substantially through 180° relative to the base. That is, in the webbing take-up device recited in JP-A No. 2014-4852, there is scope for improvement in regard to reducing a turning angle (operation angle) of the stopper relative to the base.

In consideration of the circumstances described above, an object of the present invention is to provide a webbing take-up device that may reduce a turning angle of a stopper relative to a base.

Solution to Problem

A webbing take-up device according to a first aspect of the present invention includes: a spool onto which a webbing to be applied to a vehicle occupant is taken up; a base that is rotated by rotary force being transmitted thereto; a weight that is supported at the base and includes an engaging portion, the weight moving to a rotation diameter direction outer side of the base when the base is rotated, and the weight being capable of transmitting rotary force applied to the base to the spool; and a stopper that is capable of rotating relative to the base and that is provided with an engaged portion including: an allowing portion that allows movement of the engaging portion to the rotation diameter direction outer side of the base when the base is rotating to one side, and a restricting portion that restricts movement of the engaging portion to the rotation diameter direction outer side of the base when the base is rotating to the other side, the restricting portion being formed integrally with the allowing portion.

In a webbing take-up device according to a second aspect of the present invention, the webbing take-up device according to the first aspect further includes an abutting portion provided at a location at the rotation diameter direction outer side of the stopper, the abutting portion being capable of resiliently deforming in the rotation diameter direction of the stopper, wherein, in a state in which the abutting portion is resiliently deformed in the rotation diameter direction of the stopper, the abutting portion abuts against an abutted portion provided at a member at which the stopper is disposed.

In a webbing take-up device according to a third aspect of the present invention, in the webbing take-up device according to the first aspect or the second aspect: the engaged portion includes an engaged hole at which the allowing portion and the restricting portion are disposed to be adjacent in a rotation circumference direction of the stopper; and a turning angle of the stopper relative to the base is limited to a predetermined turning angle such that the engaging portion does not abut against an end, in the rotation circumference direction of the stopper, of an inner periphery edge portion of the engaged hole.

In a webbing take-up device according to a fourth aspect of the present invention, in the webbing take-up device according to any one of the first to third aspects, the weight is disposed between the base and the stopper, and movement of the weight in a rotation axis direction relative to the base is restricted.

Advantageous Effects of Invention

In the webbing take-up device according to the first aspect of the present invention, the webbing to be applied to a vehicle occupant is taken up onto the spool. Application of the webbing to the occupant of the vehicle is enabled by the webbing being pulled out from the spool. In the present invention, the engaging portion of the weight supported at the base engages with the engaged portion provided at the stopper. When the base is rotating to the one side, the allowing portion of the engaged portion allows movement of the engaging portion of the weight to the diametric direction outer side (the rotation diameter direction outer side of the base). Accordingly, the weight moves to the diametric direction outer side (the rotation diameter direction outer side of the base), and the rotary force applied to the base is transmitted to the spool. On the other hand, when the base is rotating to the other side, the restricting portion of the engaged portion restricts movement of the engaging portion of the weight to the diametric direction outer side. Accordingly, movement of the weight to the diametric direction outer side is restricted, and the rotary force applied to the base is not transmitted to the spool. As described hereabove, in the webbing take-up device according to the present invention, the engaging portion of the weight is engaged with the engaged portion at which the allowing portion and the restricting portion are made integral. Therefore, movement of the weight to the diametric direction outer side may be allowed or restricted while an increase in a turning angle (operation angle) of the stopper relative to the base is suppressed.

In the webbing take-up device according to the second aspect of the present invention, in the state in which the abutting portion of the stopper is resiliently deformed in the diametric direction of the stopper, the abutting portion abuts against the abutted portion provided at the member at which the stopper is disposed. Therefore, a friction force is produced between the abutting portion of the stopper and the abutted portion. Thus, the stopper may be more assuredly turned relative to the base when the base is being rotated. In the present invention, a dimension of the stopper in the rotation axis direction may be made smaller than in a structure in which an abutting portion of a stopper is resiliently deformable in the rotation axis direction. Therefore, with the present invention, the webbing take-up device may be made smaller in the axial direction.

In the webbing take-up device according to the third aspect of the present invention, the turning angle of the stopper relative to the base is limited to the predetermined turning angle. As a result, the engaging portion of the weight does not abut against the end in the circumferential direction of the inner periphery edge portion of the engaged hole of the stopper. Consequently, movement of the engaging portion of the weight to the diametric direction outer side may be allowed or restricted without being affected by a friction force between the engaging portion of the weight and the end in the rotation circumference direction of the inner periphery edge portion of the engaged hole of the stopper.

In the webbing take-up device according to the fourth aspect of the present invention, the stopper is provided with the function of restricting movement of the weight in the axial direction relative to the base. Therefore, the number of components structuring the webbing take-up device may be reduced compared to a structure in which a member that restricts movement of the weight in the axial direction relative to the base is provided separately from the stopper.

DESCRIPTION OF EMBODIMENTS

A webbing take-up device according to a present exemplary embodiment is described using FIG. 1 to FIG. 13.

Figure 1:
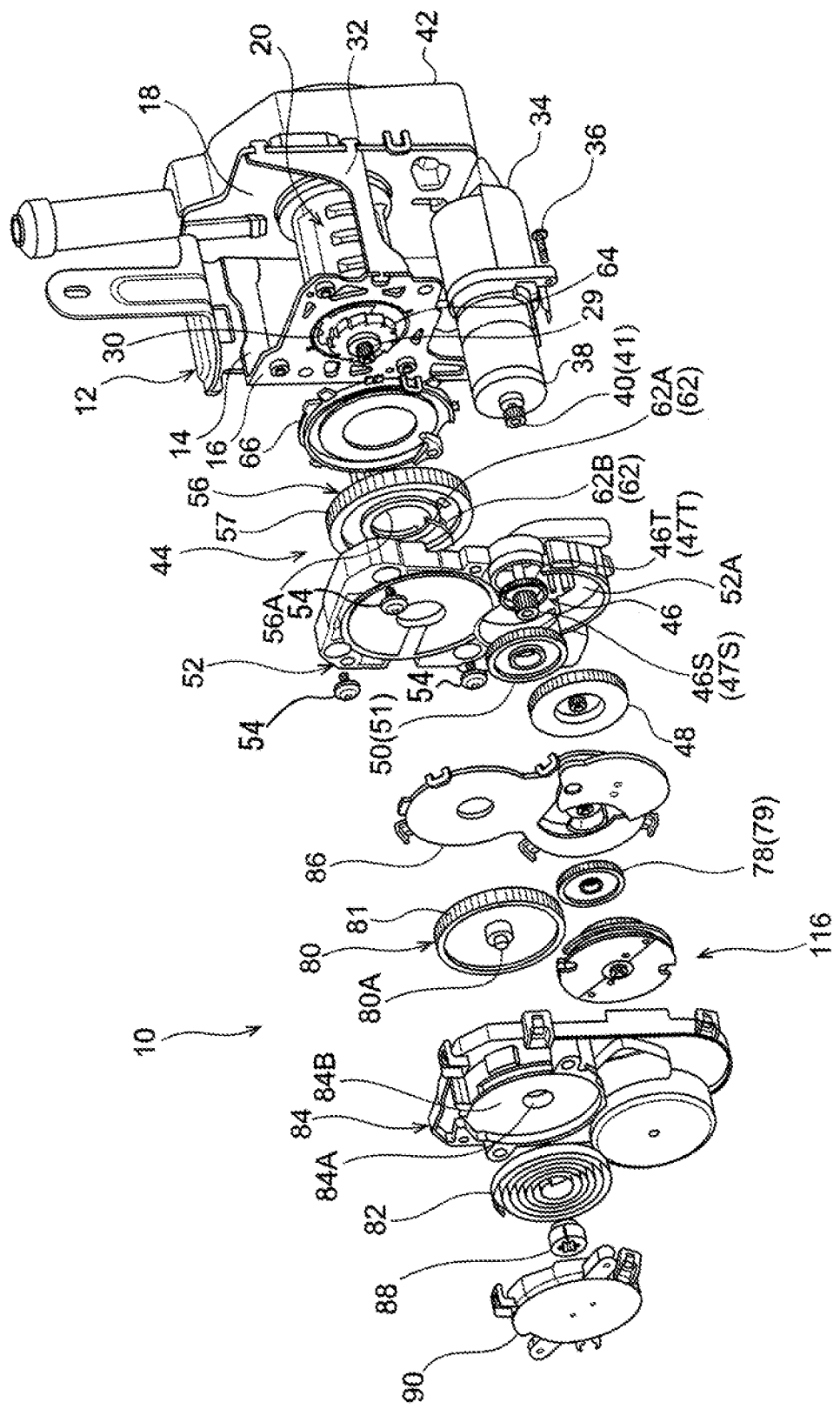
FIG. 1 is an exploded perspective view showing disassembly of a webbing take-up device according to a present exemplary embodiment.

FIG. 1 is an exploded perspective view of a webbing take-up device 10 according to the exemplary embodiment of the present invention. As shown in FIG. 1, the webbing take-up device 10 is provided with a frame 12. The frame 12 is provided with a rear plate 14 substantially in a plate shape. The rear plate 14 is fixed to a vehicle body by a fastener such as a bolt or the like, which is not shown in the drawings. Thus, the webbing take-up device 10 is fixed to the vehicle body. A pair of leg plates 16 and 18 are provided extending in parallel with one another at the two width direction ends of the rear plate 14. A spool 20 is rotatably disposed between the leg plates 16 and 18. The spool 20 is fabricated by die-casting or the like. A connecting plate 32 spans between the leg plate 16 and the leg plate 18.

The spool 20 is formed substantially in a circular tube shape. A webbing, which is not shown in the drawings, is formed in a long, narrow belt shape. A proximal end portion of the webbing is fixed to the spool 20. When the spool 20 is rotated one way about an axis thereof (below, this direction is referred to as "the take-up direction"), the webbing is taken up onto an outer periphery portion of the spool 20 in layers, starting from the proximal end side of the webbing. When a distal end side of the webbing is pulled on, the webbing that has been taken up onto the outer periphery portion of the spool 20 is pulled out, in accordance with which the spool 20 rotates the opposite way to the direction of rotation for taking up the webbing (below, the direction of rotation of the spool 20 when the webbing is pulled out is referred to as "the pull-out direction").

A bearing portion 29 is provided standing from an axial center portion of an end portion of the spool 20 at the side thereof at which the leg plate 16 is disposed. The bearing portion 29 penetrates substantially coaxially through a circular hole 30 formed in the leg plate 16 and protrudes to the outside of the frame 12. A ratchet 64, which is described below, is fixed to the projection direction proximal end side of the bearing portion 29. Thus, the ratchet 64 is made capable of rotating together with the spool 20.

A motor 38 is fixed to a gear housing 52, which is described below, via a motor cover 34 and a screw 36. The motor 38 is disposed below the spool 20 between the pair of leg plates 16 and 18 of the frame 12. An A gear 40 is fixed to an output shaft of the motor 38. Plural outer teeth 41 are formed at an outer periphery portion of the A gear 40.

A bearing portion, which is not shown in the drawings, is provided standing from an end portion of the spool 20 at the side thereof at which the leg plate 18 is disposed. This bearing portion substantially coaxially penetrates through a ratchet hole, which is not shown in the drawings, formed in the leg plate 18 and protrudes to the outside of the frame 12.

A lock base is fixed to the bearing portion. A lock plate structuring part of a lock mechanism is supported at the lock base. During a vehicle emergency (when the vehicle is rapidly decelerating or the like), the lock plate protrudes from the lock base and meshes with an inner periphery portion of the ratchet hole formed in the leg plate 18, so as to block rotation of the spool 20 in the pull-out direction. A cover 42 is also fixed to the leg plate 18. The cover 42 covers the above-described lock mechanism and suchlike.

The gear housing 52 is fixed to the leg plate 16 via a screw 54. The gear housing 52 accommodates a first clutch 44, a B gear 46, an OL gear 48 and a C gear 50.

Figure 2:
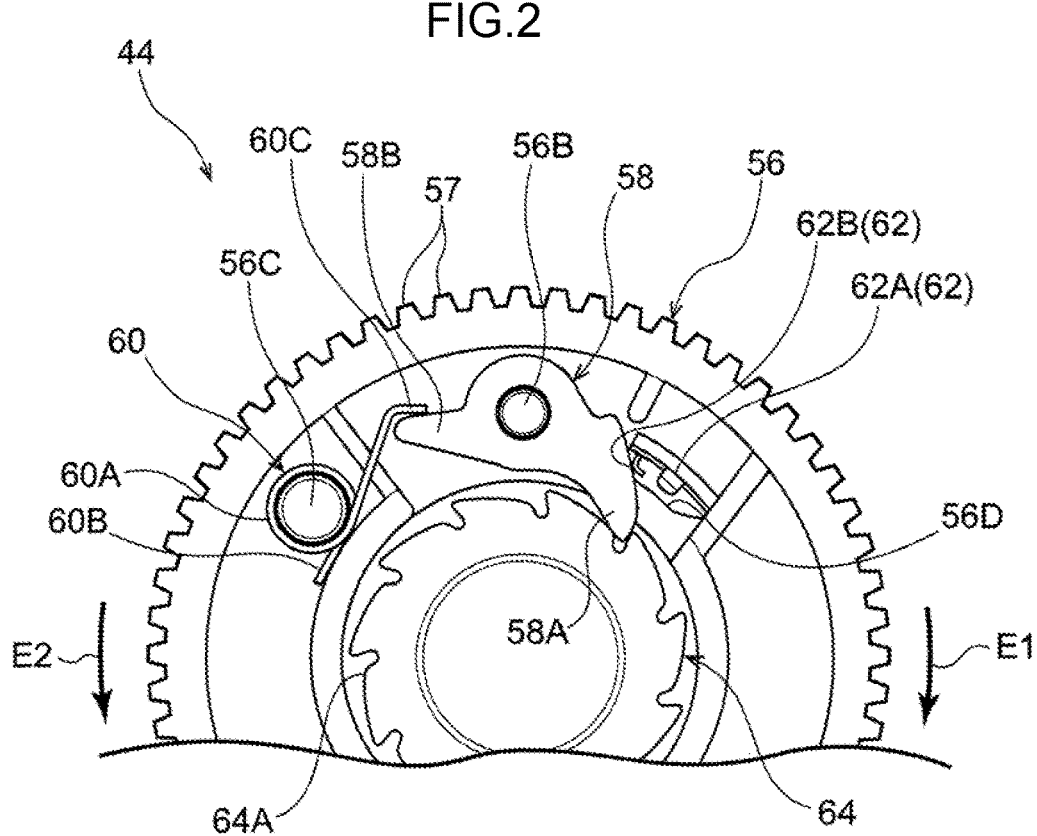
FIG. 2 is a side view, in which a first clutch is viewed from a leg plate side of a frame, showing a state in which a lock bar is engaged with a ratchet.

As shown in FIG. 2, the first clutch 44 includes a clutch gear 56 formed in a ring shape, a lock bar 58 and a return spring 60 that are attached to the clutch gear 56, a friction spring 62, and the ratchet 64 that is fixed to the spool 20.

To be specific, plural outer teeth 57 are formed at an outer periphery portion of the clutch gear 56 and, as shown in FIG. 1, a circular insertion hole 56A is formed at an inner periphery portion of the clutch gear 56. The bearing portion 29 of the spool 20 is inserted through the insertion hole 56A. As shown in FIG. 2, a lock bar support rod 56B and a return spring support rod 56C are provided standing from a diametric direction middle portion of the clutch gear 56. The lock bar support rod 56B and return spring support rod 56C protrude toward the side of the clutch gear 56 at which the leg plate 16 is disposed, and are disposed to be spaced apart in the circumferential direction of the clutch gear 56. A friction spring insertion hole 56D is formed at a circumferential direction middle portion of the clutch gear 56. A portion of the friction spring 62 is inserted through the friction spring insertion hole 56D. As shown in FIG. 1, the clutch gear 56 described above is accommodated in an accommodation recess portion formed in the gear housing 52 at the side thereof at which the leg plate 16 is disposed. A first seat 66 is attached to the gear housing 52. Thus, movement of the clutch gear 56 toward the side thereof at which the leg plate 16 is disposed is restricted.

As shown in FIG. 2, the lock bar 58 is formed substantially in a half-moon shape in an axial direction view of the clutch gear 56. The lock bar 58 is supported by and tiltable about the lock bar support rod 56B provided at the clutch gear 56. One end portion of the lock bar 58 serves as a ratchet engaging portion 58A that engages with the ratchet 64. The other end portion of the lock bar 58 serves as a return spring abutting portion 58B, against which the return spring 60 abuts.

The return spring 60 is provided with a winding portion 60A that is wound in a helical shape and supported at the return spring support rod 56C provided at the clutch gear 56. One end portion of the return spring 60 serves as an anchoring portion 60B that projects from the winding portion 60A and is anchored at a portion of the clutch gear 56. The other end portion of the return spring 60 serves as an abutting portion 60C that projects from the winding portion 60A and abuts against the return spring abutting portion 58B of the lock bar 58. The ratchet engaging portion 58A of the lock bar 58 is moved away from the ratchet 64 by an urging force of the return spring 60 being applied to the return spring abutting portion 58B of the lock bar 58.

Figure 3:
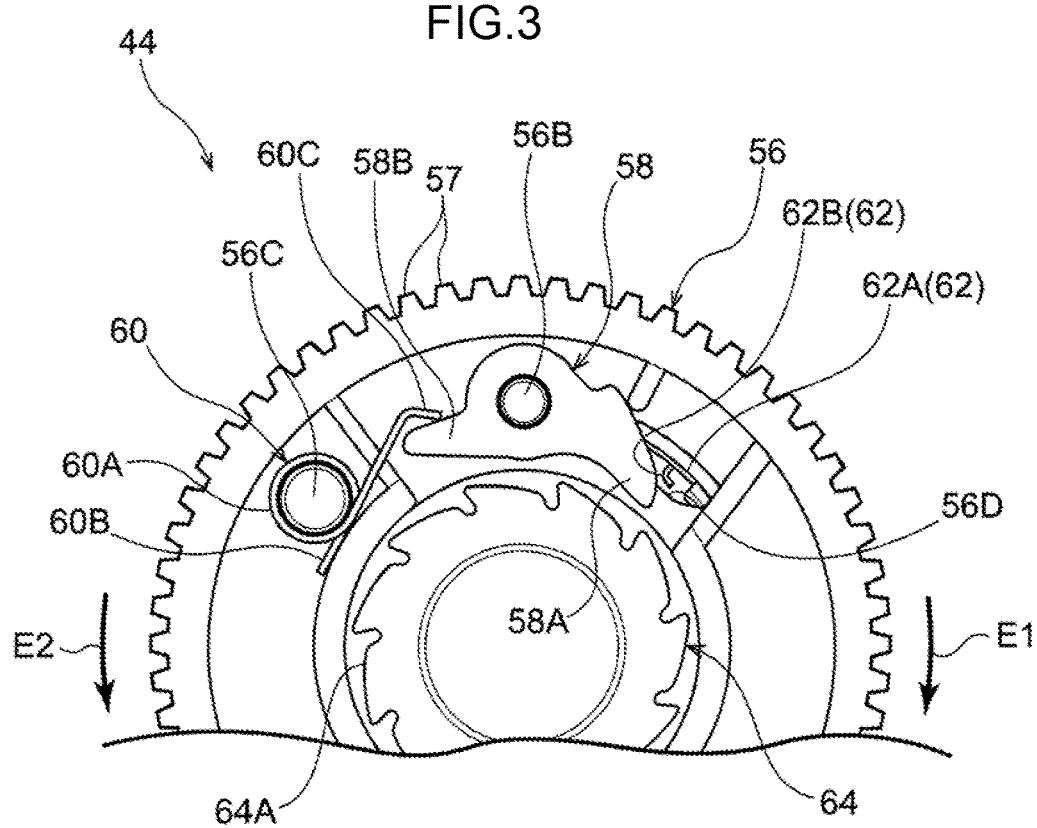
FIG. 3 is a side view corresponding to FIG. 2, in which the first clutch is viewed from the leg plate side of the frame, showing a state in which the lock bar is not engaged with the ratchet.

As shown in FIG. 1, the friction spring 62 is provided between the clutch gear 56 and the gear housing 52. The friction spring 62 is provided with a sliding portion 62A and a pushing portion 62B. The sliding portion 62A slides against the gear housing 52 when the clutch gear 56 is turned. The pushing portion 62B protrudes from the sliding portion 62A to the side thereof at which the clutch gear 56 is disposed, and is inserted through the friction spring insertion hole 56D formed in the clutch gear 56. As shown in FIG. 2, when the clutch gear 56 is turned to one axial direction side (to the arrow E1 direction side), the pushing portion 62B of the friction spring 62 pushes against the ratchet engaging portion 58A of the lock bar 58. When a force applied to the ratchet engaging portion 58A of the lock bar 58 from the pushing portion 62B of the friction spring 62 exceeds the urging force of the return spring 60, the lock bar 58 is tilted and the ratchet engaging portion 58A of the lock bar 58 engages with the ratchet 64. Hence, rotary force applied to the clutch gear 56 is applied to the ratchet 64 via the lock bar 58, and the spool 20 rotates in the take-up direction together with the ratchet 64. In contrast, as shown in FIG. 3, when the clutch gear 56 is turned to the axial direction other side (to the arrow E2 direction side), the force applied to the ratchet engaging portion 58A of the lock bar 58 from the pushing portion 62B of the friction spring 62 does not exceed the urging force of the return spring 60. Consequently, the ratchet engaging portion 58A of the lock bar 58 does not engage with the ratchet 64. Hence, rotary force applied to the clutch gear 56 is not applied to the ratchet 64 via the lock bar 58.

The ratchet 64 is formed in a circular plate shape, at an outer periphery portion of which plural engagement-receiving outer teeth 64A are formed. The ratchet engaging portion 58A of the lock bar 58 engages with the engagement-receiving outer teeth 64A. As shown in FIG. 1, the ratchet 64 is fixed to the bearing portion 29 of the spool 20 by press-fitting or the like.

The B gear 46 is provided with a large diameter portion 46T and a small diameter portion 46S. Plural outer teeth 47T are formed at an outer periphery portion of the large diameter portion 46T. The outer teeth 41 of the A gear 40 mesh with the outer teeth 47T. The small diameter portion 46S is disposed coaxially with the large diameter portion 46T and is formed integrally with the large diameter portion 46T. An outer diameter of the small diameter portion 46S is specified to be smaller than an outer diameter of the large diameter portion 46T. Plural outer teeth 47S are formed at an outer periphery portion of the small diameter portion 46S. The OL gear 48, which is described below, meshes with the outer teeth 47S.

Figure 4:
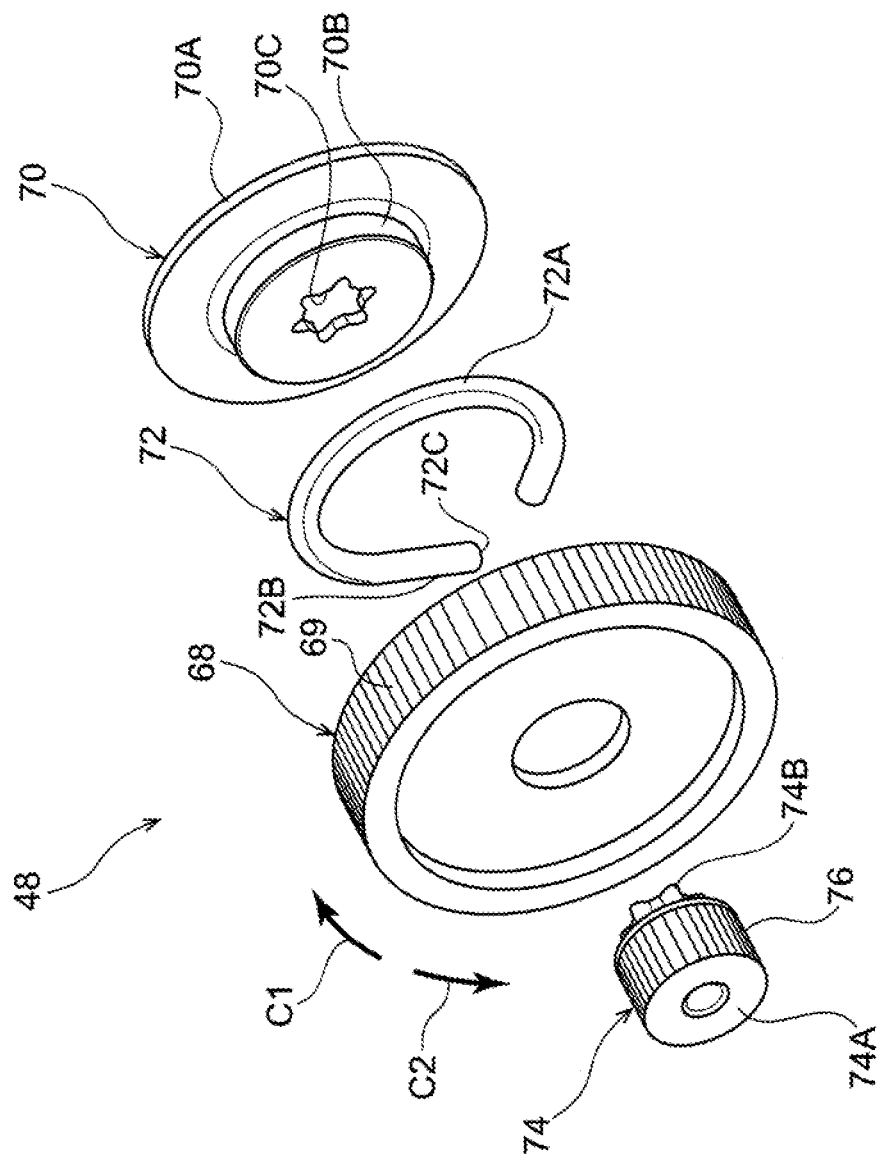
FIG. 4 is an exploded perspective view showing disassembly of an OL gear.

As shown in FIG. 4, the OL gear 48 includes an input gear 68, a rotor 70, a clutch spring 72 and an output gear 74. The input gear 68 is rotated by rotary force being transmitted from the B gear 46 (see FIG. 1). The rotor 70 is disposed coaxially with the input gear 68. The clutch spring 72 is provided between the input gear 68 and the rotor 70. The output gear 74 engages with the rotor 70 to be integrally rotatable therewith.

Figure 5:
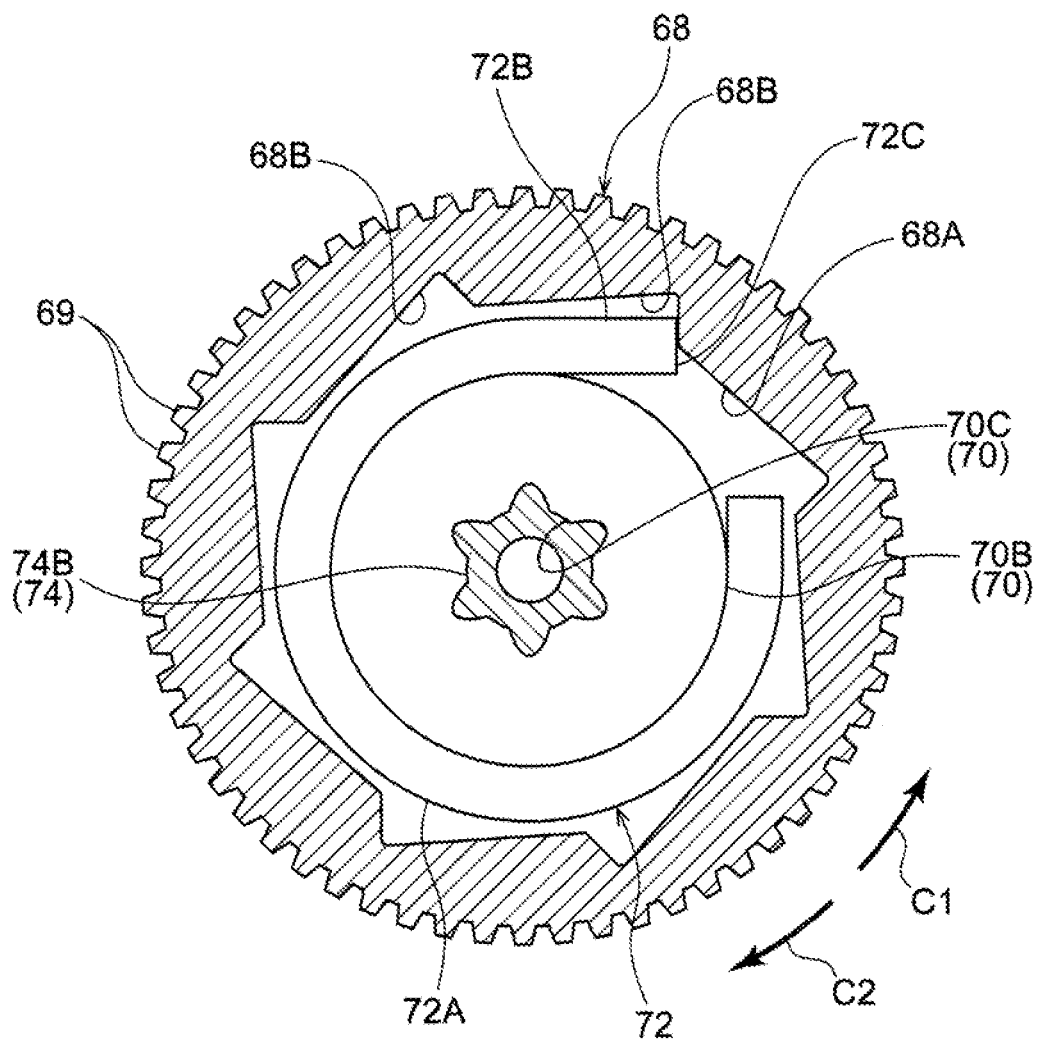
FIG. 5 is a sectional diagram showing a section in which the OL gear is cut along a diametric direction.

The input gear 68 is formed in a circular plate shape, at an outer periphery portion of which plural outer teeth 69 are formed. The outer teeth 47S formed at the small diameter portion 46S of the B gear 46 mesh with the outer teeth 69. As shown in FIG. 5, a cavity portion 68A is formed in the input gear 68. The cavity portion 68A opens to the side at which the rotor 70 is disposed. The clutch spring 72 and a wind-receiving portion 70B of the rotor 70, which are described below, are disposed in the cavity portion 68A. Plural clutch spring engaging recess portions 68B are formed along the circumferential direction of the input gear 68 at locations of the cavity portion 68A at the diametric direction outer side of the input gear 68.

As shown in FIG. 4, the rotor 70 is provided with a circular plate portion 70A and the wind-receiving portion 70B. The circular plate portion 70A is formed in a circular plate shape. The wind-receiving portion 70B is formed in a circular column shape protruding to the side at which the input gear 68 is disposed from a region at the diametric direction inner side of the circular plate portion 70A. An engaging hole 70C with a spline shape is formed at an axial center portion of the rotor 70, that is, at an axial center portion of the wind-receiving portion 70B. The output gear 74 engages with the engaging hole 70C.

The clutch spring 72 is provided with a curved portion 72A that is curved in an annular shape. In a state before the clutch spring 72 is mounted to the wind-receiving portion 70B of the rotor 70, an inner diameter of the curved portion 72A corresponds to a diameter a little smaller than an outer diameter of the wind-receiving portion 70B of the rotor 70. The curved portion 72A is pressed onto the wind-receiving portion 70B of the rotor 70 by the inner diameter of the curved portion 72A being widened and the curved portion 72A being engaged with an outer periphery face of the wind-receiving portion 70B of the rotor 70. As shown in FIG. 5, one end portion of the clutch spring 72 serves as an engaging portion 72B to be engaged with the clutch spring engaging recess portions 68B of the input gear 68. When the input gear 68 is turned to one side (in the arrow C1 direction), a portion of one of the clutch spring engaging recess portions 68B of the input gear 68 pushes against an end 72C of the engaging portion 72B. Hence, a rotary force applied to the input gear 68 is transmitted to the rotor 70 and the output gear 74 via the clutch spring 72. On the other hand, when a rotary force acts on the input gear 68 to turn the input gear 68 to the other side (in the arrow C2 direction), another portion of the clutch spring engaging recess portion 68B of the input gear 68 pushes the engaging portion 72B of the clutch spring 72 toward the side thereof at which the wind-receiving portion 70B of the rotor 70 is disposed. As a result, the engagement between the engaging portion 72B of the clutch spring 72 and the clutch spring engaging recess portion 68B is weakened. If the rotary force acting on the input gear 68 in the arrow C2 direction exceeds a predetermined value, the engagement between the engaging portion 72B of the clutch spring 72 and the clutch spring engaging recess portion 68B is released. Therefore, the OL gear 48 does not transmit a rotary force in the arrow C2 direction that exceeds the predetermined value. Thus, during pretensioning, which is described below, tension produced in the webbing is inhibited from equaling or exceeding the predetermined value.

The output gear 74 is provided with an output gear main body portion 74A and an engaging portion 74B with a spline shape. Plural outer teeth 76 that mesh with the C gear 50 are formed at an outer periphery portion of the output gear main body portion 74A. The engaging portion 74B is formed integrally with the output gear main body portion 74A and engages with the engaging hole 70C formed in the rotor 70. By the engaging portion 74B of the output gear 74 engaging with the engaging hole 70C formed in the rotor 70, the output gear 74 and the rotor 70 are joined to be capable of rotating integrally.

As shown in FIG. 1, the C gear 50 is formed in a circular plate shape at which plural outer teeth 51 are formed. The outer teeth 51 mesh with the outer teeth 76 (see FIG. 4) of the output gear 74 that structures a portion of the OL gear 48 and with the outer teeth 57 of the clutch gear 56 that structure a portion of the first clutch 44. Thus, when the C gear 50 is rotated by the output gear 74 of the OL gear 48, the C gear 50 rotates the clutch gear 56.

An accommodation recess portion 52A is formed in the gear housing 52. In a state in which the B gear 46, the OL gear 48 and the C gear 50 described above are accommodated in the accommodation recess portion 52A, the B gear 46, OL gear 48 and C gear 50 are rotatably supported at shaft portions provided in the accommodation recess portion 52A.

A spring holder 84 is fixed to the gear housing 52. An idling gear 78, a spool gear 80, a retractor spring 82 and a second clutch 116 are supported at the spring holder 84.

The idling gear 78 is formed in a circular plate shape, at an outer periphery portion of which plural outer teeth 79 are formed. The outer teeth 79 mesh with the spool gear 80 and the second clutch 116, which are described below. In a state in which the idling gear 78 is accommodated in an accommodation recess portion formed in a region of the spring holder 84 at the side thereof at which the gear housing 52 is disposed, the idling gear 78 is rotatably supported at a shaft portion provided in this accommodation recess portion. A second seat 86 is attached to the spring holder 84. Thus, movement of the idling gear 78 toward the side at which the gear housing 52 is disposed is restricted.

The spool gear 80 is formed in a circular plate shape specified to have a larger diameter than the idling gear 78. Plural outer teeth 81 that mesh with the outer teeth 79 of the idling gear 78 are formed at an outer periphery portion of the spool gear 80. An adapter fixing portion 80A is formed at an axial center portion of the spool gear 80. The adapter fixing portion 80A protrudes toward the side at which the retractor spring 82 is disposed. An engaging hole, which is not shown in the drawings, is formed in a region of the axial center portion of the spool gear 80 at the side thereof at which the spool 20 is disposed. The engaging hole engages with the bearing portion 29 of the spool 20. By the engaging hole of the spool gear 80 being engaged with the bearing portion 29 of the spool 20, the spool gear 80 and the spool 20 are joined to be capable of rotating integrally. The spool gear 80 is accommodated in an accommodation recess portion formed in a region of the spring holder 84 at the side thereof at which the gear housing 52 is disposed. In the state in which the spool gear 80 is accommodated in this accommodation recess portion, the adapter fixing portion 80A of the spool gear 80 protrudes through an insertion hole 84A formed in a floor portion of the accommodation recess portion to the side thereof at which the retractor spring 82 is disposed.

The retractor spring 82 is formed in a spiral shape and is accommodated in a spring accommodation portion 84B that is formed in the spring holder 84 at the opposite side from the side thereof at which the spool gear 80 is accommodated. An adapter 88 is fixed to the adapter fixing portion 80A of the spool gear 80. An inner end portion of the retractor spring 82 is anchored at the adapter 88. An outer end portion of the retractor spring 82 is anchored at an anchoring portion, which is not shown in the drawings, formed in the spring accommodation portion 84B. An urging force of the retractor spring 82 is transmitted to the spool 20 via the adapter 88 and the spool gear 80. Thus, the spool 20 is urged to rotate in the take-up direction. The urging force of the retractor spring 82 (and a take-up force of the webbing based on the urging force) is specified to be relatively weak, of a magnitude to eliminate slackness in the webbing applied to a vehicle occupant. That is, the urging force of the retractor spring 82 is specified to a strength that corresponds to non-compression of the vehicle occupant in the state in which the webbing is applied to the vehicle occupant. There is no need for the urging force to be strong enough to completely take up the webbing pulled out from the spool 20 in opposition to friction forces and the like acting on the webbing.

A spring cover 90 is attached to the spring holder 84. Thus, the retractor spring 82 accommodated in the spring accommodation portion 84B is covered by the spring cover 90.

Figure 6:
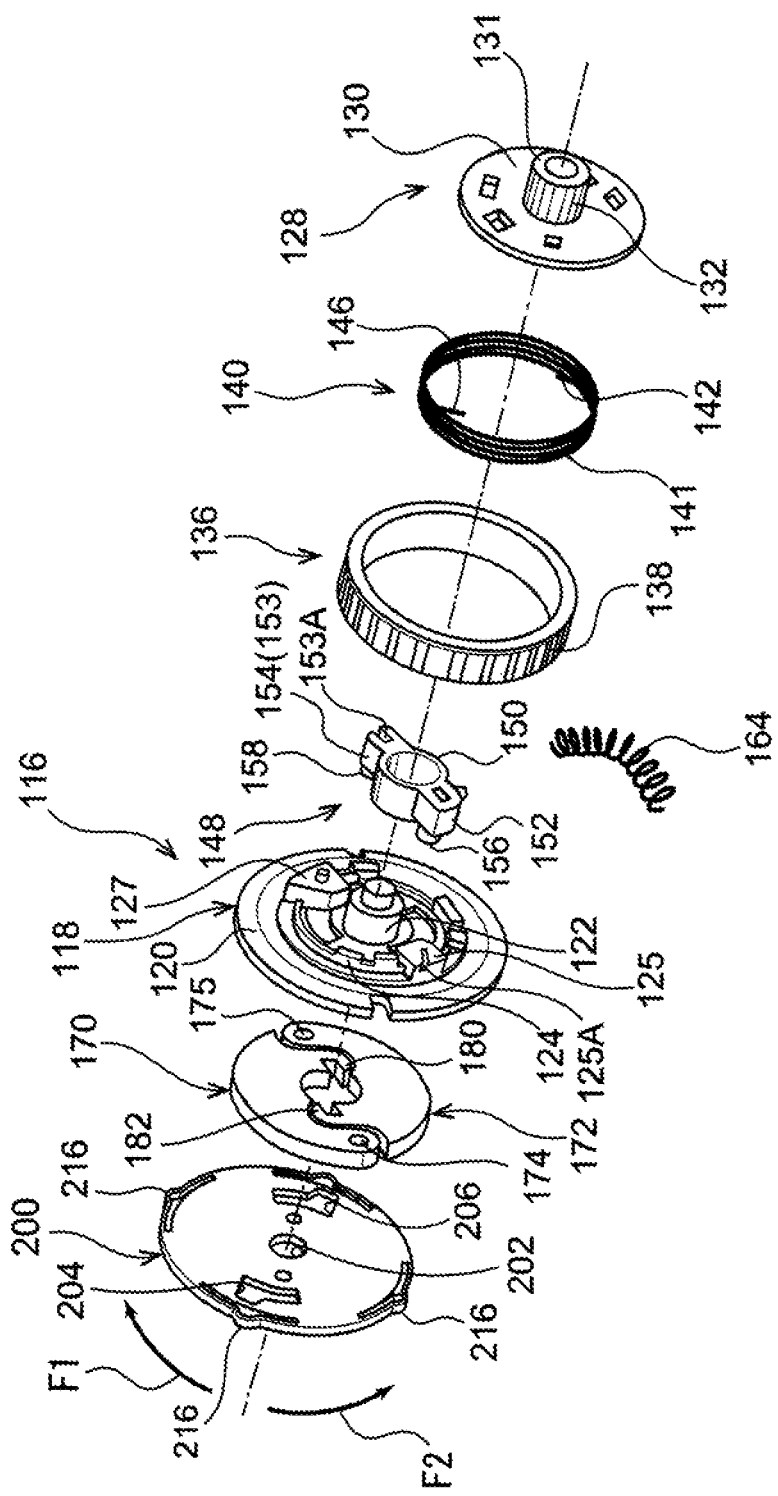
FIG. 6 is an exploded perspective view showing disassembly of a second clutch.
Figure 7:
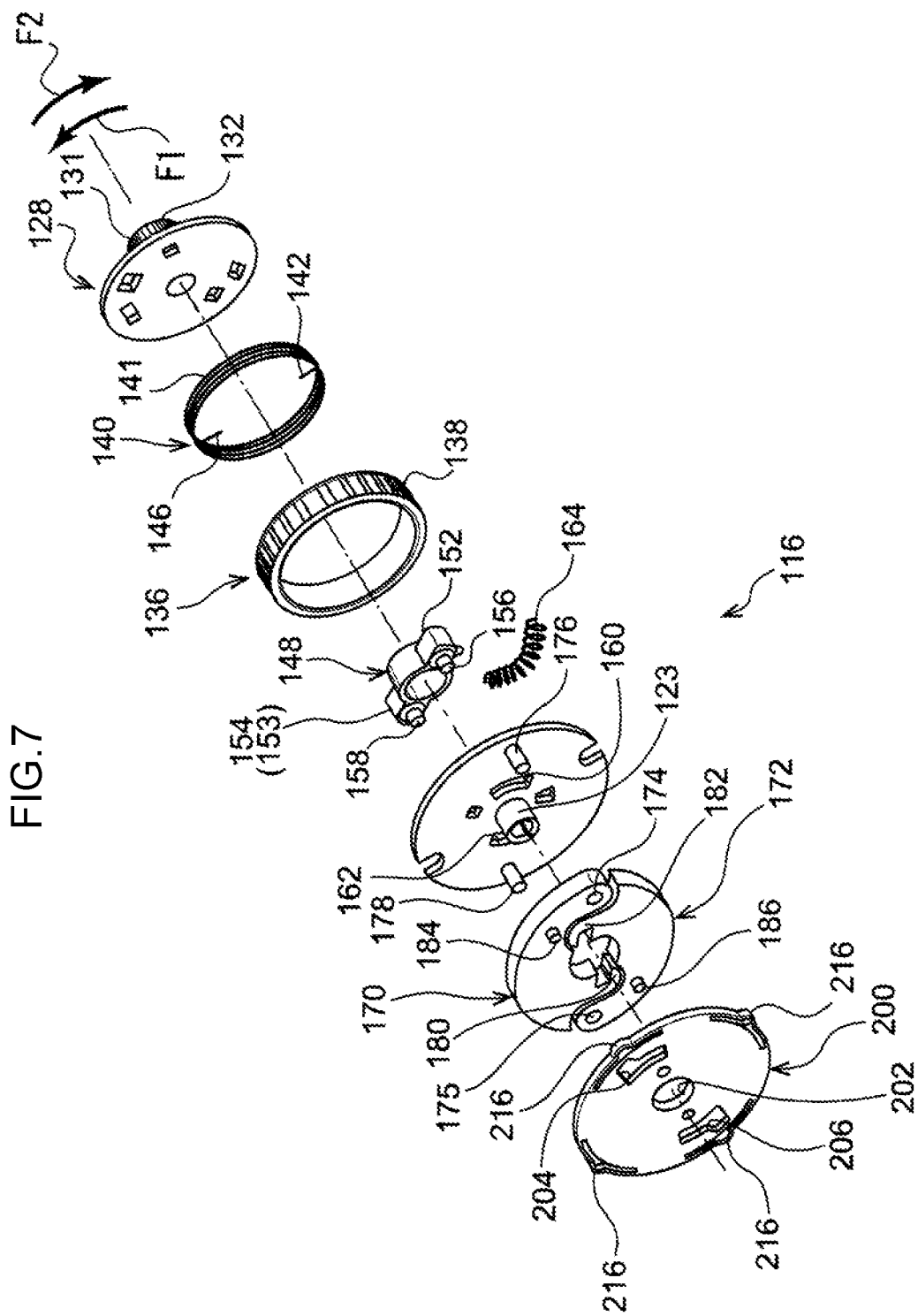
FIG. 7 is an exploded perspective view, viewed from the opposite side to FIG. 6, showing disassembly of the second clutch.
Figure 8:
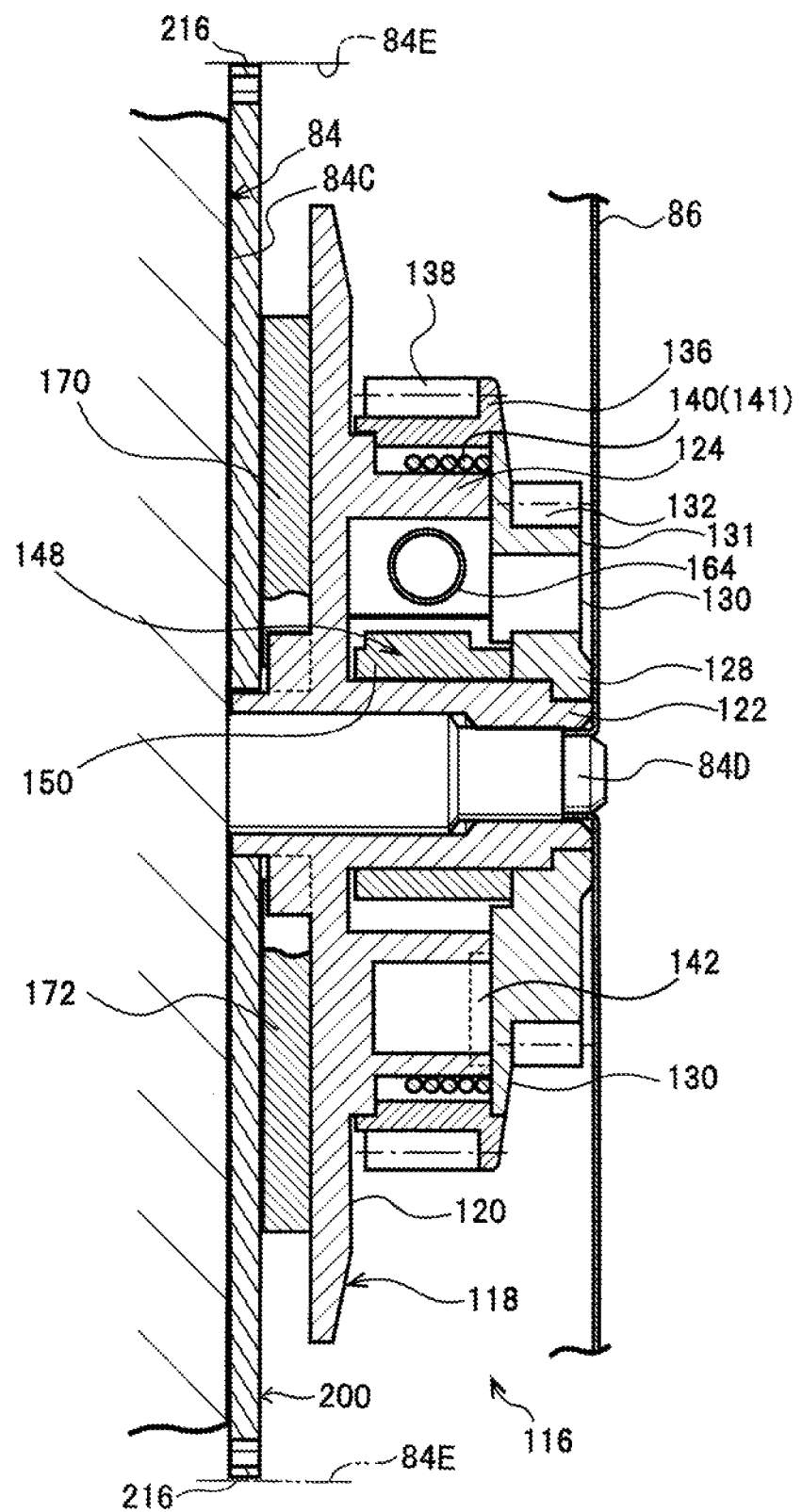
FIG. 8 is a sectional diagram showing a section in which the second clutch is cut along an axial direction.

FIG. 6 and FIG. 7 show structures of the second clutch 116 in exploded perspective views. FIG. 8 shows the structures of the second clutch 116 in a sectional diagram. As shown in these drawings, the second clutch 116 is provided with a base 118 and a rotor 128. The rotor 128 is attached to the base 118 and rotates integrally with the base 118. The second clutch 116 is further provided with a clutch gear 136, a clutch spring 140 and a lever 148. The clutch spring 140 is provided between the base 118 and the clutch gear 136. The lever 148 is rotatably supported at the base 118. The second clutch 116 is still further provided with a pair of clutch weights 170 and 172 supported at the base 118 and with a stopper 200. The clutch weights 170 and 172 serve as weights. The stopper 200 is turnably attached to the base 118. Where simply an axial direction, a diametric direction and a circumferential direction are referred to herebelow without being particularly specified, these refer to a rotation axis direction, a rotation diameter direction and a rotation circumference direction of the second clutch 116. The rotation axis direction, rotation diameter direction and rotation circumference direction of the second clutch 116 coincide with rotation axis directions, rotation diameter directions and rotation circumference directions of the base 118, the rotor 128, the clutch gear 136, the lever 148 and the stopper 200.

The base 118 is provided with a disc portion 120 formed in a circular plate shape, a spindle portion 122 with a circular rod shape, and a side wall portion 124 with a substantial "C" shape in sectional view. The spindle portion 122 protrudes to an axial direction one side of the disc portion 120 from an axial center portion of the disc portion 120. The side wall portion 124 is formed coaxially around the spindle portion 122. The base 118 is further provided with a first spring anchoring portion 125 in a block shape that protrudes in the same direction as the protrusion direction of the spindle portion 122. A first spring anchoring slot 125A is formed in the first spring anchoring portion 125. An end portion at one side of the clutch spring 140 is anchored in the first spring anchoring slot 125A. A face at the diametric direction outer side of the first spring anchoring portion 125 is formed in a cylinder surface shape with the same curvature deformation as an outer periphery face of the side wall portion 124.

Figure 9A:
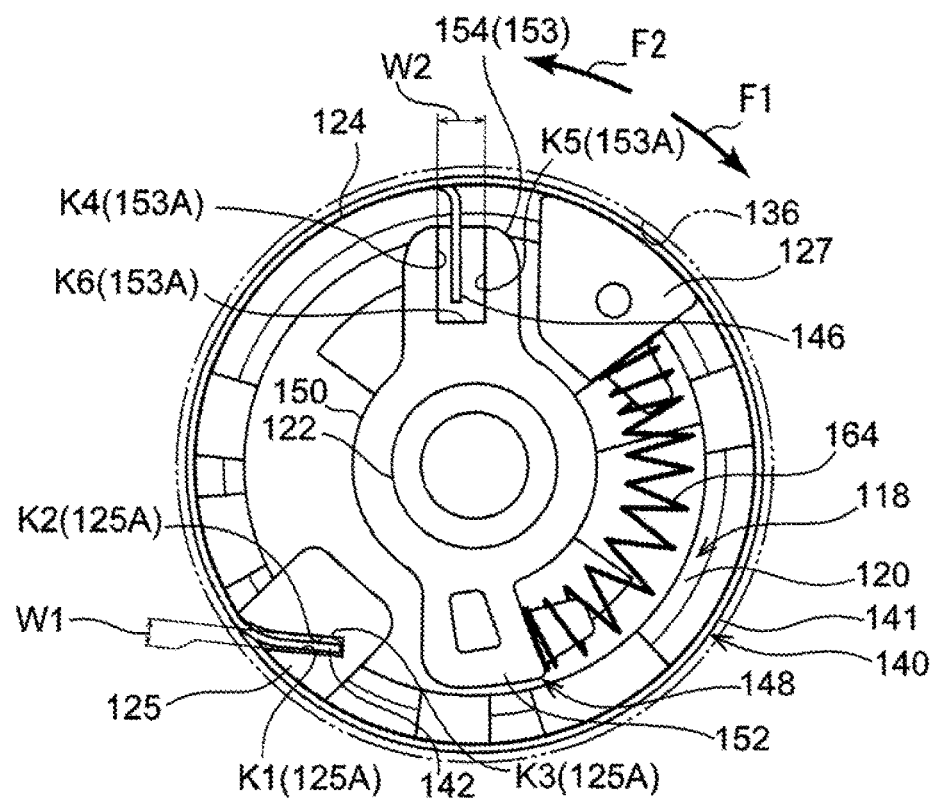
FIG. 9A is a side view showing partial structure of the second clutch, showing a usual state of a clutch spring.

As shown in FIG. 9A, the first spring anchoring slot 125A formed in the first spring anchoring portion 125 is formed in a slot shape that opens to the diametric direction outer side of the base 118 and the axial direction one side of the base 118 (the side at which the rotor 128 is disposed). The first spring anchoring slot 125A includes side wall portions K1 and K2 and a floor wall portion K3. The side wall portions K1 and K2 are disposed to be spaced apart from one another and parallel with one another. The floor wall portion K3 forms a terminating wall at a depth dimension of the first spring anchoring slot 125A. In an axial direction view of the base 118, the side wall portions K1 and K2 are angled toward the diametric direction inner side of the base 118 toward another side (the arrow F2 direction) around the axis of the base 118. A groove width W1 of the first spring anchoring slot 125A, which is to say a clearance between the side wall portion K1 and the side wall portion K2, is specified to be slightly larger than a wire diameter of a first anchor portion 142 of the clutch spring 140, which is described below. The open end of the first spring anchoring slot 125A at the one axial direction side of the base 118 is closed off by a disc portion 130 of the rotor 128, which is described below.

As shown in FIG. 6 and FIG. 7, the base 118 is provided with a spindle portion 123 in a circular tube shape that projects to the opposite side of the disc portion 120 from the side thereof at which the spindle portion 122 is provided. The base 118 is further provided with spindles 176 and 178 at the disc portion 120, at the diametric direction outer side of the spindle portion 123, that protrude toward the side of the base 118 at which the clutch weights 170 and 172 are disposed. The spindles 176 and 178 are disposed to be equally spaced along the circumferential direction of the base 118. A pair of long holes 160 and 162 are formed along the circumferential direction of the base 118 in regions of the base 118 at the diametric direction outer side of the spindle portions 122 and 123. Coupling protrusions 156 and 158 of the lever 148, which is described below, engage with the long holes 160 and 162. The coupling protrusions 156 and 158 are movable in the long holes 160 and 162 along the circumferential direction of the disc portion 120. An anchoring wall 127 is provided standing from the disc portion 120. One end portion of a return spring 164, which is described below, abuts against the anchoring wall 127.

As shown in FIG. 8, the base 118 described above is rotatably supported at a shaft portion 84D. The shaft portion 84D is disposed in an accommodation recess portion 84C formed in the spring holder 84 and is provided standing from the accommodation recess portion 84C.

As shown in FIG. 6 and FIG. 7, the rotor 128 is provided at an axial direction one end side of the spindle portion 122 of the base 118 (the right side in FIG. 6 and FIG. 7). The rotor 128 is provided with a disc portion 130 and a tubular portion 131. The disc portion 130 is formed in a circular plate shape. The tubular portion 131 is formed in a tubular shape protruding from an axial center portion of the disc portion 130 toward the opposite side of the rotor 128 from the side at which the base 118 is disposed. By a pawl portion provided at the side wall portion 124 of the base 118 engaging with the disc portion 130, the rotor 128 is fixed to be rotatable integrally with the base 118. Spur gear outer teeth 132 are formed at an outer periphery portion of the tubular portion 131. The outer teeth 132 mesh with the outer teeth 69 of the input gear 68 that structures a portion of the OL gear 48 described above (see FIG. 4).

The clutch gear 136 is provided at the diametric direction outer side of the side wall portion 124 of the base 118, to be coaxial with and relatively rotatable relative to the base 118. Plural outer teeth 138 are formed at an outer periphery portion of the clutch gear 136. The outer teeth 138 mesh with the outer teeth 79 of the idling gear 78 described above (see FIG. 1). An inner diameter dimension of the clutch gear 136 is significantly larger than an outer diameter dimension of the side wall portion 124 of the base 118. Thus, an annular gap is formed between an inner periphery face of the clutch gear 136 and an outer periphery face of the side wall portion 124. The clutch spring 140, which is a torsional coil spring, is coaxially disposed in this annular gap.

The clutch spring 140 is provided with a winding portion 141 that is wound into an annular shape between the outer periphery face of the side wall portion 124 of the base 118 and the inner periphery face of the clutch gear 136. An end portion at one side of the clutch spring 140 serves as the first anchor portion 142, which is inflected to the diametric direction inner side of the winding portion 141. As shown in FIG. 9A, the first anchor portion 142 corresponds with the first spring anchoring slot 125A mentioned above and is angled relative to the diametric direction of the winding portion 141. An end portion at the other side of the clutch spring 140 serves as a second anchor portion 146, which is inflected to the diametric direction inner side of the winding portion 141. A second spring anchoring slot 153A is formed in the lever 148, which is described below. The second anchor portion 146 corresponds with the second spring anchoring slot 153A and extends in the diametric direction of the winding portion 141. The first anchor portion 142 and the second anchor portion 146 are disposed a predetermined spacing apart in the circumferential direction of the winding portion 141. An inner diameter dimension of the winding portion 141 in the natural state thereof is specified to be smaller than an outer diameter dimension of the side wall portion 124 of the base 118. Therefore, when the winding portion 141 has been assembled to the side wall portion 124 of the base 118, the winding portion 141 is urged in the direction of reducing diameter by resilient force of the winding portion 141. Consequently, in the state in which the winding portion 141 is assembled to the side wall portion 124 of the base 118, the winding portion 141 is in area contact with the outer periphery face of the side wall portion 124 of the base 118. Moreover, in the state in which the winding portion 141 is assembled to the side wall portion 124 of the base 118, a clearance is provided between the winding portion 141 and the inner periphery face of the clutch gear 136.

The first anchor portion 142 of the clutch spring 140 is tightly fitted into and anchored at the first spring anchoring slot 125A formed in the first spring anchoring portion 125 of the base 118. The second anchor portion 146 of the clutch spring 140 is tightly fitted into and anchored at the second spring anchoring slot 153A formed in the second spring anchoring portion 153 of the lever 148, which is described below.

The lever 148 is provided with a bearing portion 150 with a circular tube shape. The spindle portion 122 of the base 118 penetrates through the tube interior of the bearing portion 150. Thus, the lever 148 is supported at the spindle portion 122 (the base 118) to be relatively rotatable about the axis. A pair of coupling portions 152 and 154 that protrude in the diametric direction are provided at an outer periphery portion of the bearing portion 150. The coupling portion 152 and coupling portion 154 are provided at opposite sides to one another along the circumferential direction (opposite sides at 180°).

As shown in FIG. 7, the coupling protrusion 156 and coupling protrusion 158 are provided in circular rod shapes at the pair of coupling portions 152 and 154, each protruding to the side at which the disc portion 120 of the base 118 is disposed. The coupling protrusions 156 and 158 are engaged with, respectively, engaging pawls 180 and 182 provided at the pair of clutch weights 170 and 172, which are described below.

Figure 9B:
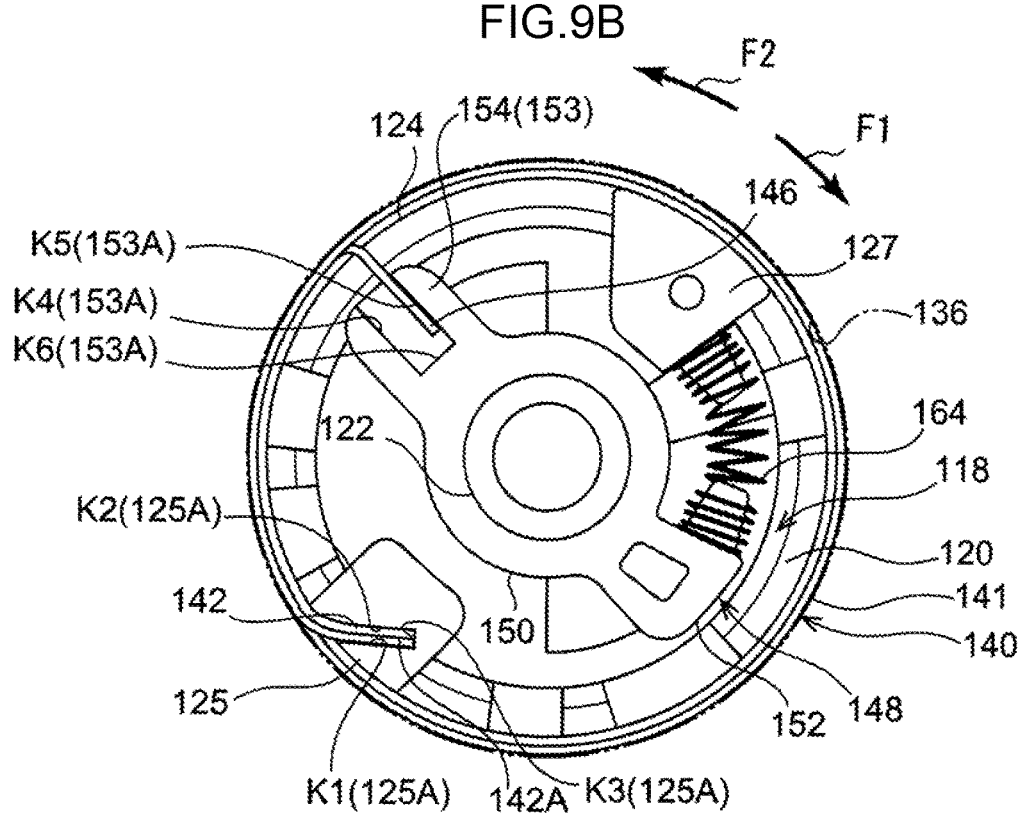
FIG. 9B is a side view showing the partial structure of the second clutch, showing a state in which an outer diameter dimension of a winding portion of the clutch spring is enlarged.

As shown in FIG. 9A and FIG. 9B, one end portion of the return spring 164, which is a torsional coil spring, is abutted against one coupling portion 152 of the lever 148. The other end portion of the return spring 164 is abutted against the anchoring wall 127 provided standing from the disc portion 120 of the base 118. The return spring 164 continuously urges the lever 148 one way around the axis of the base 118 (the arrow F1 direction in FIG. 6 and FIG. 7). Thus, the lever 148 is usually retained in a state in which the pair of coupling protrusions 156 and 158 abut against length direction one end portions of the pair of long holes 160 and 162 of the disc portion 120 (the end portions at the arrow F1 direction sides of the long holes 160 and 162 in FIG. 6 and FIG. 7).

As shown in FIG. 9A, the other coupling portion 154 of the lever 148 serves as a second spring anchoring portion 153. The second anchor portion 146 of the clutch spring 140 is anchored at the second spring anchoring portion 153. The second spring anchoring slot 153A is formed in the second spring anchoring portion 153. The second anchor portion 146 of the clutch spring 140 tightly fits into the second spring anchoring slot 153A. Accordingly, as shown in FIG. 9A and FIG. 9B, when the lever 148 is turned the other way around the axis relative to the base 118 (the arrow F2 direction in FIG. 9A and FIG. 9B), in opposition to the resilient force of the return spring 164, the second anchor portion 146 of the clutch spring 140 is moved one way in the winding direction of the clutch spring 140 (the arrow F2 direction in FIG. 9A and FIG. 9B) and the outer diameter dimension of the winding portion 141 of the clutch spring 140 is enlarged. Similarly to the first spring anchoring slot 125A, the second spring anchoring slot 153A includes side wall portions K4 and K5 and a floor wall portion K6. In the present exemplary embodiment, in the state in which the lever 148 is supported at the base 118, the side wall portions K4 and K5 are substantially parallel with the diametric direction of the base 118. A groove width W2 of the second spring anchoring slot 153A, which is to say a clearance between the side wall portion K4 and the side wall portion K5, is specified to be significantly wider than a wire diameter of the second anchor portion 146 of the clutch spring 140. As a result, ease of assembly of the clutch spring 140 to the base 118 and the lever 148 is excellent.

When the outer diameter dimension of the winding portion 141 of the clutch spring 140 is enlarged as described above, the winding portion 141 of the clutch spring 140 presses against the inner periphery face of the clutch gear 136. In this state, a predetermined friction force is produced between the outer periphery portion of the clutch spring 140 and the inner periphery face of the clutch gear 136. Consequently, the clutch spring 140 and the clutch gear 136 are integrally joined by this friction force.

Meanwhile, as shown in FIG. 6 to FIG. 8, the pair of clutch weights 170 and 172 are disposed at the axial direction other side of the base 118 (the opposite side of the base 118 from the side at which the rotor 128 is disposed). The clutch weights 170 and 172 are formed in substantially semicircular plate shapes. The pair of clutch weights 170 and 172 are specified to have the same weights, and are provided at opposite sides to one another along the circumferential direction of the disc portion 120 (opposite sides at 180°). Circular bearing holes 174 and 175 are formed in respective circumferential direction one end sides of the pair of clutch weights 170 and 172. The spindle 176 and spindle 178 provided protruding from the disc portion 120 of the base 118 in circular rod shapes fit into the bearing holes 174 and 175 to be freely turnable. Thus, the clutch weights 170 and 172 are supported at the base 118 to be turnable (tiltable) in the diametric direction of the base 118 about, respectively, the spindles 176 and 178 (the bearing holes 174 and 175.

The clutch weight 170 is provided with the engaging pawl 180 in a substantial "U" shape, which engages with the coupling protrusion 158 of the lever 148 described above. The other clutch weight 172 is provided with the engaging pawl 182 in a substantial "U" shape, which similarly engages with the coupling protrusion 156 of the lever 148. Therefore, the pair of clutch weights 170 and 172 are synchronized (coupled) via the lever 148, and are usually retained at the diametric direction inner side of the base 118 by the urging force of the return spring 164 acting on the lever 148.

The pair of clutch weights 170 and 172 are further provided with engaging portions 184 and 186 in circular rod shapes, which protrude to the side of the clutch weights 170 and 172 at which the stopper 200, which is described below, is disposed.

As shown in FIG. 6 and FIG. 7, the stopper 200 is disposed at the opposite side of the pair of clutch weights 170 and 172 from the side at which the base 118 is disposed. The stopper 200 is formed in a circular plate shape. A circular aperture portion 202 is formed at an axial center portion of the stopper 200. The shaft portion 84D provided standing from the accommodation recess portion 84C formed in the spring holder 84 (see FIG. 8) is inserted through the aperture portion 202, and the aperture portion 202 tightly fits to an outer periphery portion of the spindle portion 123 of the base 118. The stopper 200 prevents the pair of clutch weights 170 and 172 from falling from the base 118. In addition, the stopper 200 functions as a spacer that prevents the pair of clutch weights 170 and 172 from interfering with a floor wall of the accommodation recess portion 84C formed in the spring holder 84.

A pair of engaged holes 204 and 206 that serve as engaged portions are formed in a diametric direction middle portion of the stopper 200. The engaged holes 204 and 206 engage with, respectively, the engaging portion 184 of the clutch weight 170 and the engaging portion 186 of the clutch weight 172. The engaged hole 204 and the engaged hole 206 are disposed at equal spacings along the circumferential direction of the stopper 200.

Figure 10A:
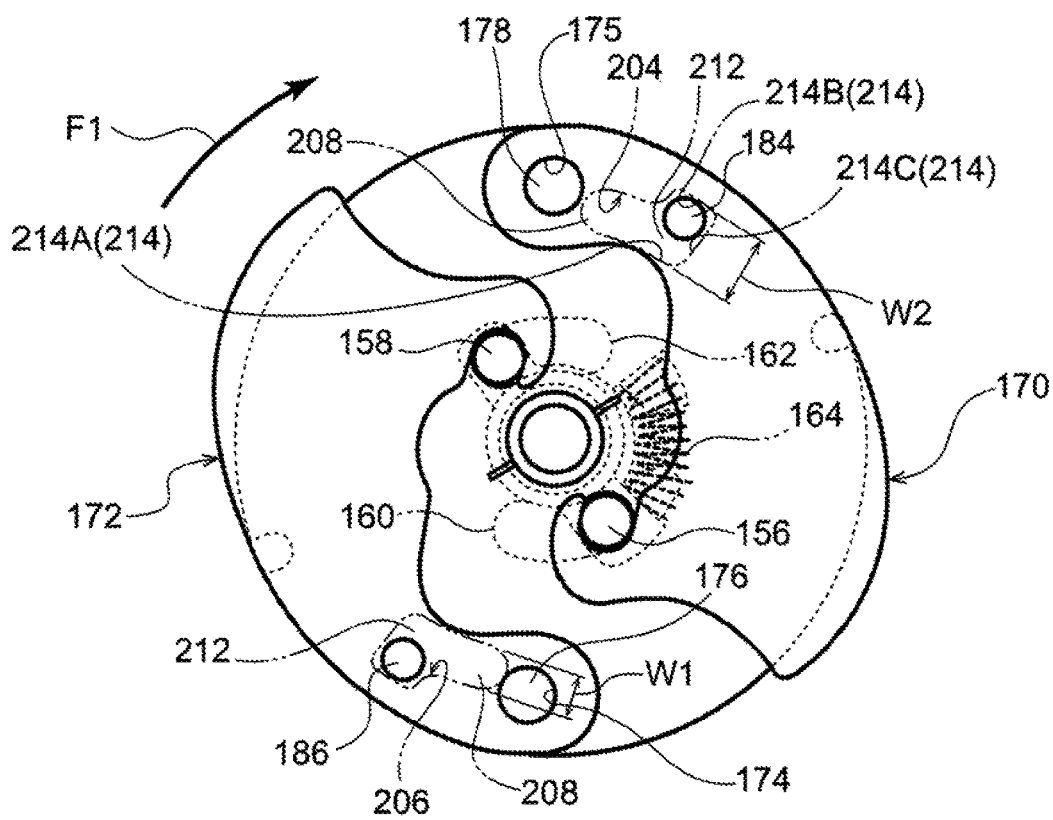
FIG. 10A is a side view showing partial structure of the second clutch, which is a structural member of the webbing take-up device, showing a state in which a pair of clutch weights are extended to the diametric direction outer side of a base.
Figure 10B:
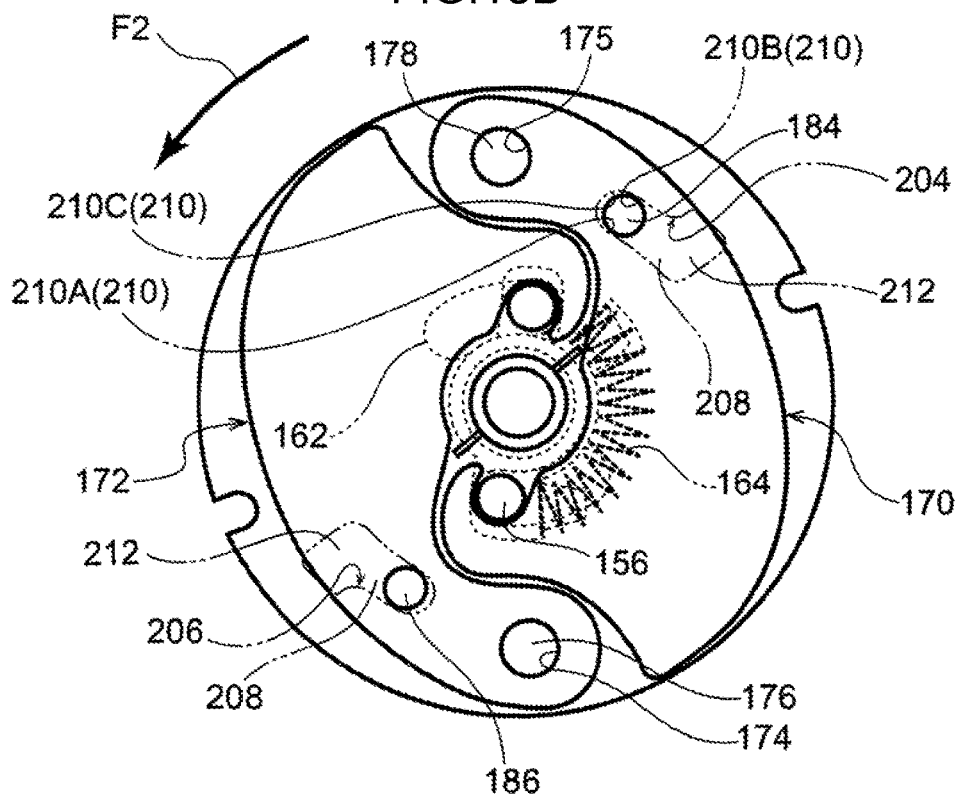
FIG. 10B is a side view showing the partial structure of the second clutch that is a structural member of the webbing take-up device, showing a state in which the pair of clutch weights are retained at the diametric direction inner side of the base.
Figure 11:
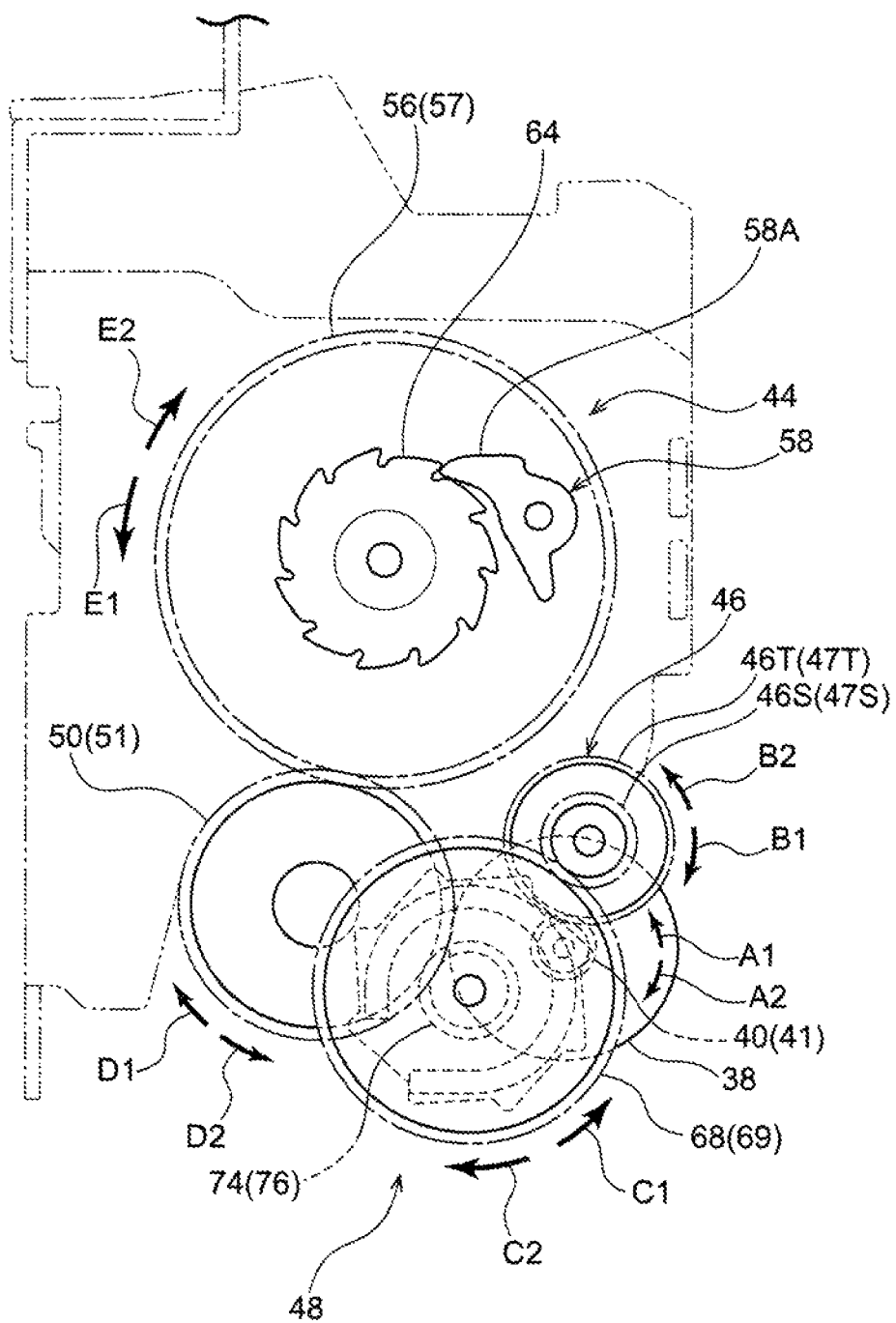
FIG. 11 is a descriptive diagram for describing a first transmission path of rotation of an output shaft of a motor during fitting assistance and during pretensioning.

As shown in FIG. 10A and FIG. 10B, a portion of each of the engaged holes 204 and 206 at a circumferential direction one side of the stopper 200 (the arrow F2 direction side) serves as a restricting portion 208. A width dimension W1 (a dimension in the diametric direction of the stopper 200) of each restricting portion 208 is a little larger than outer diameters of the engaging portions 184 and 186 of the clutch weights 170 and 172. As shown in FIG. 10B, when the engaging portions 184 and 186 of the clutch weights 170 and 172 are disposed in the restricting portions 208 inside the engaged holes 204 and 206, each of the engaging portions 184 and 186 abuts against a portion 210B at the diametric direction outer side of an inner periphery edge portion 210 of the restricting portion 208. Thus, movement of the pair of clutch weights 170 and 172 to the diametric direction outer side from the state in which the clutch weights 170 and 172 are retained at the diametric direction inner side of the base 118 is restricted.

As shown in FIG. 10A and FIG. 10B, a portion of each of the engaged holes 204 and 206 at the circumferential direction other side of the stopper 200 (the arrow F1 direction) serves as an allowing portion 212. A width dimension W2 (a dimension in the diametric direction of the stopper 200) of each allowing portion 212 is significantly larger than the outer diameters of the engaging portions 184 and 186 of the clutch weights 170 and 172. A portion 214A at the diametric direction inner side of an inner periphery edge portion 214 of each allowing portion 212 is disposed at the same position in the diametric direction as a portion 210A at the diametric direction inner side of the inner periphery edge portion 210 of the restricting portion 208. A portion 214B at the diametric direction outer side of the inner periphery edge portion 214 of the allowing portion 212 is disposed at the diametric direction outer side relative to the portion 210B at the diametric direction outer side of the inner periphery edge portion 210 of the restricting portion 208. As shown in FIG. 10A, when the engaging portions 184 and 186 of the clutch weights 170 and 172 are disposed in the allowing portions 212 inside the engaged holes 204 and 206, movement of the engaging portions 184 and 186 to positions abutting against the portions 214B at the diametric direction outer side of the inner periphery edge portions 214 of the allowing portions 212 is enabled. That is, the pair of clutch weights 170 and 172 are capable of moving to the diametric direction outer side from the state in which the clutch weights 170 and 172 are retained at the diametric direction inner side of the base 118.

In the present exemplary embodiment, a limiting portion, which is not shown in the drawings, is provided. The limiting portion limits turning angles of the stopper 200 relative to the base 118 to predetermined angles. Therefore, the engaging portions 184 and 186 of the clutch weights 170 and 172 do not abut against either end in the circumferential direction of the inner periphery edge portions of the engaged holes 204 and 206. That is, the engaging portions 184 and 186 of the clutch weights 170 and 172 do not abut against end portions 210C at the arrow F2 direction sides of the inner periphery edge portions 210 of the restricting portions 208, and do not abut against end portions 214C at the arrow F1 direction sides of the inner periphery edge portions 214 of the allowing portions 212.

As shown in FIG. 6 and FIG. 7, four abutting portions 216 are provided at an outer periphery portion of the stopper 200. The four abutting portions 216 are formed in protruding shapes towards the diametric direction outer side, and are disposed at equal intervals along the circumferential direction. Thickness reduction holes are formed in regions at the diametric direction inner sides of the abutting portions 216. Thus, the abutting portions 216 are capable of resiliently deforming towards the diametric direction inner side. As shown in FIG. 8, in the state in which the stopper 200 is disposed in the accommodation recess portion 84C formed in the spring holder 84, the abutting portions 216 of the stopper 200 abut against an inner periphery face 84E of the accommodation recess portion 84C in a state in which the abutting portions 216 are resiliently deformed to the diametric direction inner side. The inner periphery face 84E serves as an abutted portion.

In the second clutch 116 according to the present exemplary embodiment, when the rotor 128 rotates the other way around the axis thereof (the arrow F1 direction in FIG. 6 and FIG. 7), the base 118 that is integrally joined to the rotor 128 rotates the other way around the axis together with the rotor 128. Consequently, the pair of clutch weights 170 and 172 supported at the base 118 rotate around the axis of the base 118 to follow the base 118. At this time, centrifugal forces act on the pair of clutch weights 170 and 172. Thus, rotary torque around the spindle 176 acts on the clutch weight 170 and rotary torque around the spindle 178 acts on the clutch weight 172.

Hence, when the magnitude of these rotary torques is at least a predetermined value, that is, when the speed of rotation of the pair of clutch weights 170 and 172 is at least a predetermined value, the pair of clutch weights 170 and 172 turn around the spindle 176 and the spindle 178 to the diametric direction outer side of the base 118 in opposition to the urging force of the return spring 164 that acts on the lever 148. As a result, the lever 148, of which the coupling protrusion 158 engages with the engaging pawl 180 of the clutch weight 170 and the coupling protrusion 156 engages with the engaging pawl 182 of the clutch weight 172, turns the other way around the axis relative to the base 118 (the arrow F2 direction in FIG. 9A and FIG. 9B).

In the present exemplary embodiment, rotary force of the output shaft of the motor 38 is transmitted to the rotor 128 via the A gear 40, the B gear 46 and the OL gear 48.

Operation and Effects of the Present Exemplary Embodiment

Now, operation and effects of the present exemplary embodiment are described.

In the webbing take-up device 10 with the structure described above as illustrated in FIG. 1, in a stowed state, the webbing is taken up onto the spool 20 in layers. When a tongue plate, which is not shown in the drawings, is pulled on and the webbing is pulled out from the stowed state, the webbing is pulled out while the spool 20 is rotated in the pull-out direction in opposition to the urging force of the retractor spring 82 that urges the spool 20 in the take-up direction.

In this state in which the webbing is pulled out, the webbing is wrapped round the front of the body of a vehicle occupant sitting on a seat, the tongue plate is inserted into a buckle apparatus, and the tongue plate is retained at the buckle apparatus. Thus, the webbing is applied to the body of the vehicle occupant.

When the insertion of the tongue plate into the buckle apparatus is detected by a switch or the like, which is not shown in the drawings, a motor control device, which is not shown in the drawings, rotates the output shaft of the motor 38 in a forward direction. The rotation of the output shaft of the motor 38 is transmitted to the spool 20 via a first transmission path illustrated in FIG. 11. To be specific, the output shaft of the motor 38 rotates the A gear 40 in the arrow A1 direction. When the A gear 40 is rotated in the arrow A1 direction, the B gear 46 is rotated in the arrow B1 direction by the A gear 40, and the OL gear 48 is rotated in the arrow C1 direction by the B gear 46. Further, the C gear 50 is rotated in the arrow D1 direction by the OL gear 48, and the clutch gear 56 of the first clutch 44 is rotated in the arrow E1 direction by the C gear 50. When the clutch gear 56 is being rotated in the arrow E1 direction, the lock bar 58 engages with the ratchet 64. Therefore, the rotation of the clutch gear 56 is transmitted to the ratchet 64, and the spool 20 is rotated in the take-up direction together with the ratchet 64. As a result, the webbing is taken up onto the spool 20 and slackness in the webbing applied to the vehicle occupant is eliminated (known as "fitting assistance"). Hence, in a state in which the rotation of the output shaft of the motor 38 has stopped, the vehicle occupant is restrained with a relatively weak force by the urging force of the retractor spring 82.

In a state in which the vehicle is running, if a rapid deceleration of the vehicle or the like is detected by a detection device, which is not shown in the drawings, the motor control device that is not shown in the drawings rotates the output shaft of the motor 38 in the forward direction. A rotation force of the output shaft of the motor 38 at this time is specified to be higher than the rotation force during the fitting assistance described above. This rotation of the output shaft of the motor 38 in the forward direction is transmitted to the spool 20 via the first transmission path shown in FIG. 11. Thus, the webbing is taken up onto the spool 20 and slackness in the webbing applied to the vehicle occupant is eliminated (known as "pretensioning").

Alternatively, when the vehicle occupant stops the vehicle and releases the tongue plate from the buckle apparatus, the spool 20 is rotated in the take-up direction by the urging force of the retractor spring 82. Because the urging force of the retractor spring 82 is specified to be relatively weak, the spool 20 rotates in the take-up direction with a relatively weak rotation force corresponding to the urging force of the retractor spring 82.

Figure 12:
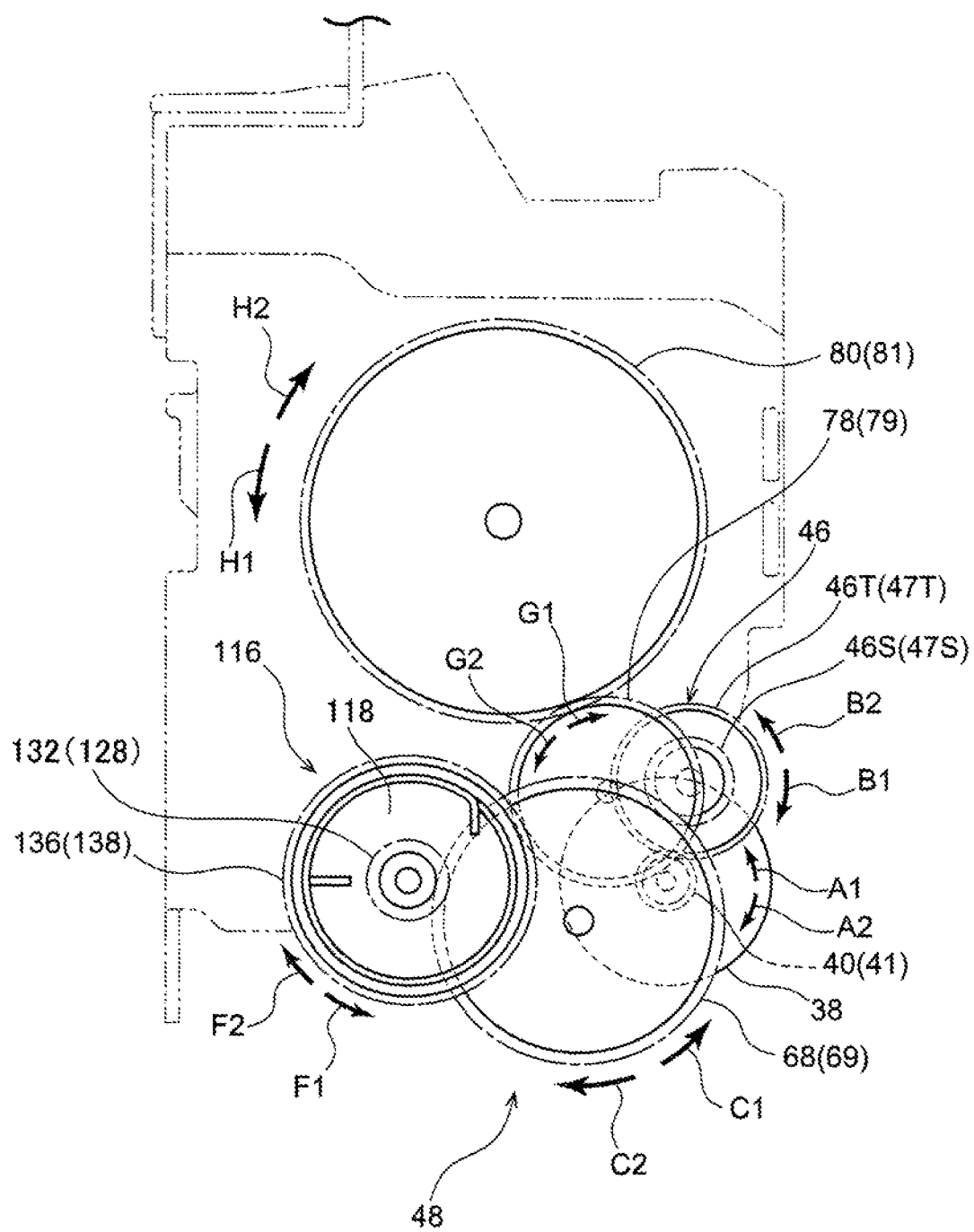
FIG. 12 is a descriptive diagram for describing a second transmission path of rotation of the output shaft of the motor during take-up assistance.

At this time, the motor control apparatus that is not shown in the drawings rotates the output shaft of the motor 38 in the reverse direction. This rotation of the output shaft of the motor 38 is transmitted to the spool 20 via a second transmission path, which is illustrated in FIG. 12. A reduction gear ratio of the second transmission path is specified to be higher than a reduction gear ratio of the first transmission path.

When the output shaft of the motor 38 is rotated in the reverse direction, the output shaft of the motor 38 rotates the A gear 40 in the arrow A2 direction. When the A gear 40 is rotated in the arrow A2 direction, the B gear 46 is rotated in the arrow B2 direction by the A gear 40, and the OL gear 48 is rotated in the arrow C2 direction by the B gear 46. Further, the base 118 of the second clutch 116 is rotated in the arrow F1 direction by the OL gear 48, via the rotor 128.

As shown in FIG. 8, the stopper 200 is disposed in the accommodation recess portion 84C in the state in which the abutting portions 216 of the stopper 200 abut against the inner periphery face 84E of the accommodation recess portion 84C. Therefore, when the base 118 starts to rotate in the arrow F1 direction, the stopper 200 starts to rotate later than the base 118. That is, the stopper 200 relatively rotates in the arrow F2 direction relative to the base 118. Consequently, as shown in FIG. 10A, the engaging portions 184 and 186 of the clutch weights 170 and 172 are disposed in the allowing portions 212 of the engaged holes 204 and 206 of the stopper 200.

The rotation of the base 118 is transmitted to the clutch weight 170 via the spindle 176 and the bearing hole 174 and is transmitted to the clutch weight 172 via the spindle 178 and the bearing hole 175. Thus, the clutch weight 170 and the clutch weight 172 rotate around the axis of the base 118 to follow the base 118. In consequence, centrifugal forces act on the clutch weight 170 and the clutch weight 172. As a result, the clutch weight 170 and the clutch weight 172 turn (tilt) around the spindles 176 and 178 toward the diametric direction outer side of the base 118, in opposition to the urging force of the return spring 164 that acts on the lever 148.

Consequently, the lever 148, at which the coupling protrusion 158 engages with the engaging pawl 180 of the clutch weight 170 and the coupling protrusion 156 engages with the engaging pawl 182 of the clutch weight 172, is turned the other way around the axis relative to the base 118 (in the arrow F1 direction in FIG. 9A and FIG. 9B).

When the lever 148 turns the other way around the axis relative to the base 118, the second anchor portion 146 of the clutch spring 140 is moved the one way in the winding direction of the clutch spring 140 (the arrow F2 direction in FIG. 9A and FIG. 9B) by the lever 148. As a result, the outer diameter dimension of the winding portion 141 of the clutch spring 140 is enlarged, and the outer periphery portion of the winding portion 141 of the clutch spring 140 is put into area contact with the inner periphery face of the clutch gear 136. Consequently, the rotation of the clutch spring 140 is transmitted to the clutch gear 136, and the clutch gear 136 is rotated in the arrow F1 direction. As shown in FIG. 12, because the outer teeth 79 of the idling gear 78 mesh with the outer teeth 138 of the clutch gear 136, the idling gear 78 is rotated in the arrow G1 direction. Hence, the spool gear 80 is rotated in the arrow H1 direction by the idling gear 78, and the spool 20 rotates in the take-up direction together with the spool gear 80. This rotation of the spool 20 compensates for insufficiency of the urging force of the retractor spring 82, and the webbing is taken up and stowed on the spool 20 in layers (known as "take-up assistance").

At this time, the spool 20 is rotated with a smaller torque than during the fitting assistance described above. Thus, the webbing may be taken up onto and stowed at the spool 20 safely. In the present exemplary embodiment, the webbing may be easily pulled out from the spool 20 when the take-up assistance described above is being implemented. That is, the spool 20 may be easily rotated in the pull-out direction in opposition to the take-up assistance torque.

When the webbing has been completely taken up onto the spool 20, the power supply to the motor 38 is cut off by the motor control device and the rotation of the output shaft of the motor 38 stops.

When the rotation of the motor 38 stops, the clutch weight 170 and the clutch weight 172 are turned to the diametric direction inner side of the base 118 by the resilient force of the clutch spring 140 and the resilient force of the return spring 164 acting on the lever 148. Accordingly, the clutch spring 140 returns to the natural state thereof, the outer periphery portion of the winding portion 141 is separated from the inner periphery face of the clutch gear 136, and the joining of the clutch spring 140 with the clutch gear 136 described above is immediately released. Thus, the coupling of the spool 20 with the output shaft of the motor 38 by the second clutch 116 is released, and the webbing taken up onto the spool 20 may be pulled out again.

Figure 13:
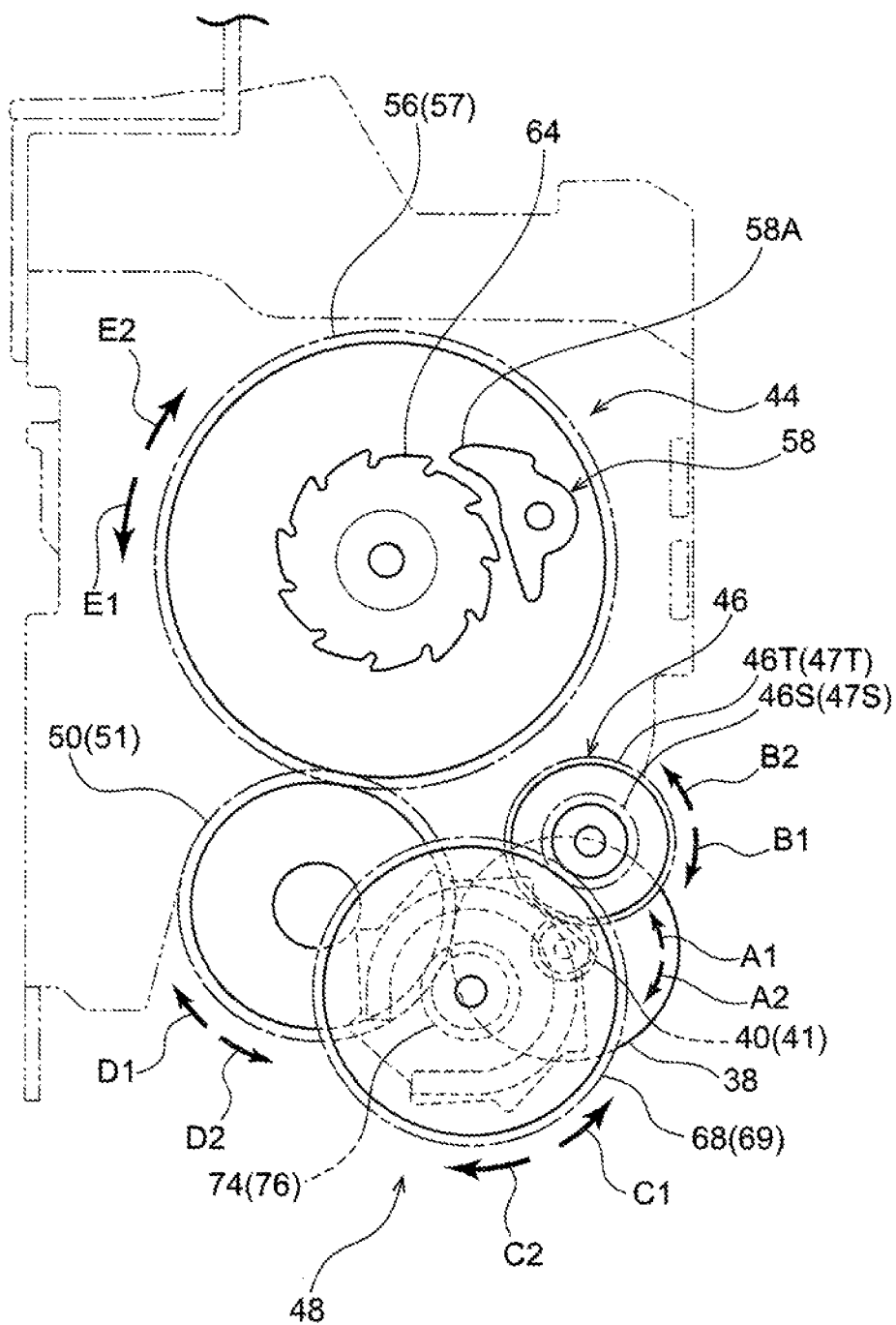
FIG. 13 is a descriptive diagram for describing the first transmission path of rotation of the output shaft of the motor during take-up assistance.

As illustrated in FIG. 13, the rotation of the output shaft of the motor 38 in the reverse direction during take-up assistance is transmitted to the clutch gear 56 of the first clutch 44 via the A gear 40, the B gear 46, the OL gear 48 and the C gear 50. Thus, the clutch gear 56 is rotated in the arrow E2 direction. At this time, the lock bar 58 supported at the clutch gear 56 does not engage with the ratchet 64. Therefore, the rotation of the output shaft of the motor 38 in the reverse direction during take-up assistance is not transmitted to the spool 20 via the first transmission path (the A gear 40, the B gear 46, the OL gear 48, the C gear 50 and the first clutch 44).

As shown in FIG. 12, the rotation of the output shaft of the motor 38 in the forward direction during fitting assistance and during pretensioning is transmitted to the base 118 of the second clutch 116 via the A gear 40, the B gear 46 and the OL gear 48, and the base 118 is rotated in the arrow F2 direction. When the base 118 starts to rotate to arrow F2, the stopper 200 starts to rotate later than the base 118. In other words, the stopper 200 relatively rotates in the arrow F1 direction relative to the base 118. In consequence, as shown in FIG. 10B, the engaging portions 184 and 186 of the clutch weights 170 and 172 are disposed in the restricting portions 208 of the engaged holes 204 and 206 of the stopper 200, and movement of the clutch weights 170 and 172 to the diametric direction outer side is restricted. Therefore, when the output shaft of the motor 38 is rotating in the forward direction, the clutch gear 136 and clutch spring 140 structuring the second clutch 116 do not engage. As a result, a number of occasions of engagement between the clutch gear 136 and clutch spring 140 structuring the second clutch 116 is reduced. As a result, durability of the second clutch 116 may be improved.

In the present exemplary embodiment, the engaging portions 184 and 186 of the clutch weights 170 and 172 are engaged with the engaged holes 204 and 206 at which the allowing portions 212 and the restricting portions 208 are integrated. Therefore, movement of the clutch weights 170 and 172 to the diametric direction outer side may be allowed or restricted while an increase in a turning angle (operation angle) of the stopper 200 relative to the base 118 is suppressed.

In the present exemplary embodiment, as shown in FIG. 8, the stopper 200 is disposed in the accommodation recess portion 84C in the state in which the abutting portions 216 of the stopper 200 abut against the inner periphery face 84E of the accommodation recess portion 84C. Therefore, a friction force is produced between the abutting portions 216 of the stopper 200 and the inner periphery face 84E of the accommodation recess portion 84C, and the stopper 200 may be more assuredly relatively turned relative to the base 118 when the base 118 is being rotated. In the present exemplary embodiment, a dimension of the stopper 200 in the axial direction may be made smaller than in a structure in which abutting portions of the stopper 200 are resiliently deformable in the axial direction of the stopper 200. Therefore, the webbing take-up device 10 according to the present exemplary embodiment may be made smaller in the axial direction.

In the present exemplary embodiment, the limiting portion, which is not shown in the drawings, that limits turning angles of the stopper 200 relative to the base 118 to predetermined angles is provided. As a result, the engaging portions 184 and 186 of the clutch weights 170 and 172 do not abut against the respective ends in the circumferential direction of the inner periphery edge portions of the engaged holes 204 and 206 shown in FIG. 10A and FIG. 10B. Therefore, movement of the engaging portions 184 and 186 of the clutch weights 170 and 172 to the diametric direction outer side may be allowed or restricted without being affected by friction forces between the engaging portions 184 and 186 of the clutch weights 170 and 172 and the respective ends in the circumferential direction of the inner periphery edge portions of the engaged holes 204 and 206 of the stopper 200.

In the present exemplary embodiment, the stopper 200 is provided with the function of restricting movement of the clutch weights 170 and 172 in the axial direction relative to the base 118. Therefore, the number of components structuring the webbing take-up device 10 may be reduced compared to a structure in which a member that restricts movement of the clutch weights 170 and 172 in the axial direction relative to the base 118 is provided separately from the stopper 200.

In the present exemplary embodiment, an example is described in which the function of restricting movement of the clutch weights 170 and 172 in the axial direction relative to the base 118 is assigned to the stopper 200, but the present invention is not limited thus. Whether or not the function of restricting movement of the clutch weights 170 and 172 in the axial direction relative to the base 118 is assigned to the stopper 200 may be specified as appropriate in consideration of a space in which the stopper 200 is to be disposed and the like.

In the present exemplary embodiment, a structure in which the engaging portions 184 and 186 of the clutch weights 170 and 172 do not abut against the respective ends in the circumferential direction of the inner periphery edge portions of the engaged holes 204 and 206 is described as an example, but the present invention is not limited thus. For example, the engaging portions 184 and 186 of the clutch weights 170 and 172 may be allowed to abut against the respective ends in the circumferential direction of the inner periphery edge portions of the engaged holes 204 and 206.

In the present exemplary embodiment, an example is described in which the abutting portions 216 of the stopper 200 are abutted against the inner periphery face 84E of the accommodation recess portion 84C in a state in which the abutting portions 216 are resiliently deformed in the diametric direction, but the present invention is not limited thus. For example, structures are possible in which abutting portions that are resiliently deformable in the axial direction are provided at the stopper 200. Structures are also possible in which no portion corresponding to the abutting portions 216 is provided at the stopper 200.

Hereabove, an exemplary embodiment of the present invention has been described. The present invention is not limited by these descriptions and it will be clear that numerous modifications outside of these descriptions may be embodied.

The disclosures of Japanese Patent Application No. 2015-136272 filed Jul. 7, 2015 are incorporated into the present specification by reference in their entirety.

The invention claimed is:

1. A webbing take-up device comprising:
    a spool onto which a webbing to be applied to a vehicle occupant is taken up;
    a base that is rotated by rotary force being transmitted thereto;
    a weight that is supported at the base and includes an engaging portion, the weight moving to a rotation diameter direction outer side of the base when the base is rotated, and the weight being capable of transmitting rotary force applied to the base to the spool; and
    a stopper that is capable of rotating relative to the base and that is provided with an engaged portion, the engaged portion including:
        an allowing portion that allows movement of the engaging portion to the rotation diameter direction outer side of the base when the base is rotating to one side, and
        a restricting portion that restricts movement of the engaging portion to the rotation diameter direction outer side of the base when the base is rotating to the other side, the restricting portion being formed integrally with the allowing portion.

2. The webbing take-up device according to claim 1, wherein:
    the engaged portion includes an engaged hole at which the allowing portion and the restricting portion are disposed to be adjacent in a rotation circumference direction of the stopper; and
    a turning angle of the stopper relative to the base is limited to a predetermined turning angle such that the engaging portion does not abut against an end, in the rotation circumference direction of the stopper, of an inner periphery edge portion of the engaged hole.

3. The webbing take-up device according to claim 1, wherein the weight is disposed between the base and the stopper, and movement of the weight in a rotation axis direction relative to the base is restricted.

* * * * *